(12) United States Patent
Chen

(10) Patent No.: US 11,768,425 B2
(45) Date of Patent: Sep. 26, 2023

(54) ACTUATOR, PROJECTION DEVICE, AND PROJECTION METHOD

(71) Applicant: Coretronic Corporation, Hsin-Chu (TW)

(72) Inventor: Wei-Hao Chen, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 17/845,997

(22) Filed: Jun. 21, 2022

(65) Prior Publication Data

US 2022/0413370 A1 Dec. 29, 2022

(30) Foreign Application Priority Data

Jun. 24, 2021 (CN) .......................... 202110701851.9

(51) Int. Cl.
*G03B 21/14* (2006.01)
*H04N 9/31* (2006.01)
*G02B 26/08* (2006.01)

(52) U.S. Cl.
CPC ......... *G03B 21/142* (2013.01); *G03B 21/145* (2013.01)

(58) Field of Classification Search
CPC .. G03B 21/142; G03B 21/145; H04N 9/3188; G02B 26/08; G02B 26/0875; G02B 26/0883; G02B 26/0891; G02B 26/10; G02B 26/101; G02B 26/105
See application file for complete search history.

(56) References Cited

U.S. PATENT DOCUMENTS

2021/0294094 A1* 9/2021 Wakabayashi ......... G03B 21/14

FOREIGN PATENT DOCUMENTS

CN 110068906 7/2019

* cited by examiner

*Primary Examiner* — Ryan D Howard
(74) *Attorney, Agent, or Firm* — JCIPRNET

(57) ABSTRACT

An actuator, a projection device, and a projection method are provided. The projection method includes the following. A first optical element is disposed in a first frame body. At least one first driving assembly is disposed between a first base and the first frame body. A second optical element is disposed in a second frame body. At least one second driving assembly is disposed between a second base and the second frame body. The first driving assembly is controlled by a first signal to drive the first frame body, such that the first optical element reciprocally swing relative to the first base based on a first actuating axis and a second actuating axis. The second driving assembly is controlled by a second signal to drive the second frame body, such that the second optical element reciprocally swing relative to the second base based on a third actuating axis.

20 Claims, 24 Drawing Sheets

891

S221 — Dispose a first frame body in a first base, dispose a first optical element in the first frame body, dispose at least one first driving assembly between the first base and the first frame body, dispose a second frame body in a second base, dispose a second optical element in the second frame body, and dispose at least one second driving assembly between the second base and the second frame body S223 — Control the at least one first driving assembly to drive the first frame body by a first signal, such that the first optical element reciprocally swings relative to the first base based on a first actuating axis and a second actuating axis, and control the at least one second driving assembly to drive the second frame body by a second signal, such that the second optical element reciprocally swings relative to the second base based on a third actuating axis, wherein the first signal includes a first driving signal corresponding to the first actuating axis and a second driving signal corresponding to the second actuating axis, and the second signal includes a third driving signal corresponding to the third actuating axis, wherein the first driving signal and the second driving signal have a first frequency, and the third driving signal has a second frequency different from the first frequency, and wherein a phase difference between the first driving signal and the second driving signal is not equal to zero

FIG. 20

ACTUATOR, PROJECTION DEVICE, AND PROJECTION METHOD

CROSS-REFERENCE TO RELATED APPLICATION

This application claims the priority benefit of Chinese application no. 202110701851.9, filed on Jun. 24, 2021. The entirety of the above-mentioned patent application is hereby incorporated by reference herein and made a part of this specification.

BACKGROUND

Technical Field

The disclosure relates to an actuator, a projection device, and a projection method.

Description of Related Art

With the quality improvement of cable TV or Internet streaming video, people's demands for high-resolution projectors is gradually increasing. In order to increase the resolution of a projector, an actuator may be disposed at an appropriate position in the projector, so that a light beam generated by the projector passes through an optical element on the actuator. When the actuator is actuated, the optical element carried by the actuator can reciprocally swing to thereby project the light beam passing through the optical element to different positions, accordingly increasing the resolution of an image projected by the projector. Currently, most of the actuators on the market are single-axis actuators or dual-axis actuators, so the resolution of the projector can only be increased by 1 to 4 times.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention were acknowledged by a person of ordinary skill in the art.

SUMMARY

The disclosure provides an actuator, a projection device, and a projection method, in which the number of actuating axes of the actuator can be increased, thereby increasing the resolution of the projection device.

Other objectives and advantages of the disclosure may be further understood from the technical features disclosed in the disclosure.

In order to achieve one, some, or all of the above objectives or other objectives, an embodiment of the disclosure provides an actuator. The actuator includes a first base, a first frame body, a first optical element, at least one first driving assembly, a second base, a second frame body, a second optical element, at least one second driving assembly, and a controller. The first frame body is disposed in the first base. The first optical element is disposed in the first frame body. The at least one first driving assembly is disposed between the first base and the first frame body. The second frame body is disposed in the second base. The second optical element is disposed in the second frame body. The at least one second driving assembly is disposed between the second base and the second frame body. The controller is coupled to the at least one first driving assembly and the at least one second driving assembly. The controller is configured to control the at least one first driving assembly to drive the first frame body by a first signal, such that the first optical element reciprocally swings relative to the first base based on a first actuating axis and a second actuating axis, and control the at least one second driving assembly to drive the second frame body by a second signal, such that the second optical element reciprocally swings relative to the second base based on a third actuating axis. The first signal includes a first driving signal corresponding to the first actuating axis and a second driving signal corresponding to the second actuating axis, and the second signal includes a third driving signal corresponding to the third actuating axis. The first driving signal and the second driving signal have a first frequency, and the third driving signal has a second frequency different from the first frequency. A phase difference between the first driving signal and the second driving signal is not equal to zero.

In order to achieve one, some, or all of the above objectives or other objectives, another embodiment of the disclosure provides a projection device. The projection device includes an illumination system, a light valve, a projection lens, and an actuator. The illumination system is configured to emit an illumination light beam. The light valve is located on a first transmission path of the illumination light beam, and the light valve is configured to convert the illumination light beam into an image light beam. The projection lens is located on a second transmission path of the image light beam, and the projection lens is configured to project the image light beam. The actuator is located on a transmission path of the image light beam, and the actuator is disposed between the light valve and the projection lens or a part of the actuator is disposed in the projection lens. The actuator includes a first base, a first frame body, a first optical element, at least one first driving assembly, a second base, a second frame body, a second optical element, at least one second driving assembly, and a controller. The first frame body is disposed in the first base. The first optical element is disposed in the first frame body. The at least one first driving assembly is disposed between the first base and the first frame body. The second frame body is disposed in the second base. The second optical element is disposed in the second frame body. The at least one second driving assembly is disposed between the second base and the second frame body. The controller is coupled to the at least one first driving assembly and the at least one second driving assembly. The controller is configured to control the at least one first driving assembly to drive the first frame body by a first signal, such that the first optical element reciprocally swings relative to the first base based on a first actuating axis and a second actuating axis, and control the at least one second driving assembly to drive the second frame body by a second signal, such that the second optical element reciprocally swings relative to the second base based on a third actuating axis. The first signal includes a first driving signal corresponding to the first actuating axis and a second driving signal corresponding to the second actuating axis, and the second signal includes a third driving signal corresponding to the third actuating axis. The first driving signal and the second driving signal have a first frequency, and the third driving signal has a second frequency different from the first frequency. A phase difference between the first driving signal and the second driving signal is not equal to zero.

In order to achieve one, some, or all of the above objectives or other objectives, another embodiment of the disclosure provides a projection method adapted for an actuator. The actuator includes a first base, a first frame body, a first optical element, at least one first driving assembly, a second base, a second frame body, a second optical element, and at least one second driving assembly. The projection method includes the following. The first frame body is disposed in the first base, the first optical element is disposed in the first frame body, the at least one first driving assembly is disposed between the first base and the first frame body, the second frame body is disposed in the second base, the second optical element is disposed in the second frame body, and the at least one second driving assembly is disposed between the second base and the second frame body. The at least one first driving assembly is controlled to drive the first frame body by a first signal, such that the first optical element reciprocally swings relative to the first base based on a first actuating axis and a second actuating axis, and the at least one second driving assembly is controlled to drive the second frame body by a second signal, such that the second optical element reciprocally swings relative to the second base based on a third actuating axis. The first signal includes a first driving signal corresponding to the first actuating axis and a second driving signal corresponding to the second actuating axis, and the second signal includes a third driving signal corresponding to the third actuating axis. The first driving signal and the second driving signal have a first frequency, and the third driving signal has a second frequency different from the first frequency. A phase difference between the first driving signal and the second driving signal is not equal to zero.

Based on the foregoing, the embodiments of the disclosure have at least one of the following advantages or effects. In the embodiments of the disclosure, the actuator of the disclosure may include at least three actuating axes. The actuator may control the optical element to reciprocally swing based on at least three actuating axes according to the corresponding driving frequencies, thereby increasing the resolution of the projection device.

Other objectives, features and advantages of the invention will be further understood from the further technological features disclosed by the embodiments of the invention wherein there are shown and described preferred embodiments of this invention, simply by way of illustration of modes best suited to carry out the invention.

To make the aforementioned more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 20 is a flowchart of a projection method according to an embodiment of the disclosure.

DESCRIPTION OF THE EMBODIMENTS

It is to be understood that other embodiment may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings.

Figure 1A:
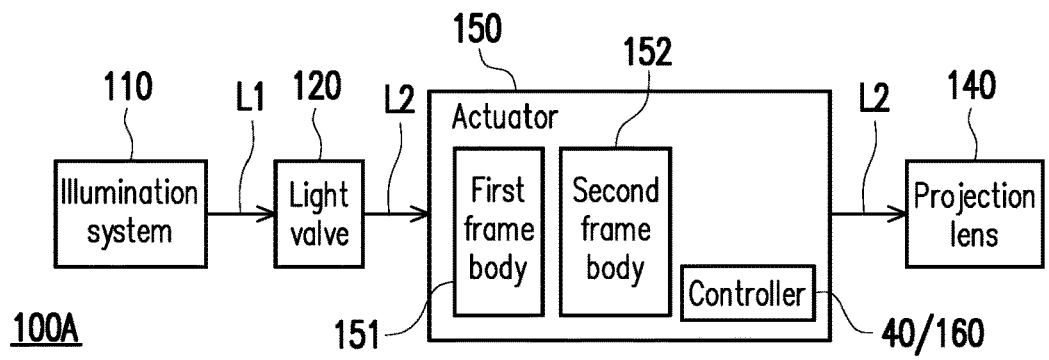
FIG. 1A is a schematic diagram showing a projection device according to an embodiment of the disclosure.

FIG. 1A is a schematic diagram showing a projection device 100A according to an embodiment of the disclosure. The projection device 100A may include an illumination system 110, a light valve 120, a projection lens 140, and an actuator 150. In an embodiment, the actuator 150 may include a plurality of frame bodies such as a frame body 151 and a frame body 152.

The illumination system 110 may be configured to provide an illumination light beam L1. The light valve 120 is located on a transmission path of the illumination light beam L1. The light valve 120 may be configured to convert the illumination light beam L1 into an image light beam L2. The light valve 120 is, for example, a liquid crystal on silicon panel (LCoS panel) a digital micro-mirror device (DMD), or other reflective optical modulators. The light valve 120 may also be, for example, a transparent liquid crystal panel, an electro-optical modulator, a magneto-optic modulator, an acoustic optical modulator (AOM), or other transparent optical modulators. The projection lens 140 is located on a transmission path of the image light beam L2. The projection lens 140 may be configured to project the image light beam L2. For example, the projection lens 140 may project the image light beam L2 onto a wall or screen out of the projection device 100A. The projection lens 140 is, for example, one lens or a combination of more optical lenses having a refracting power. For example, the projection lens 140 may include a combination of non-planar lenses such as a biconcave lens, a biconvex lens, a concave-convex lens, a convex-concave lens, a plano-convex lens, or a plano-concave lens. In an embodiment, the projection lens 140 may also include a planar optical lens. The actuator 150 is located on the transmission path of the image light beam L2, and the actuator 150 may be disposed between the light valve 120 and the projection lens 140. The frame body 151 or the frame body 152 of the actuator 150 may include an optical element, and the optical element may be configured to increase the resolution of the image light beam. In another embodiment, part of the actuator 150 may be disposed in the projection lens 140. For example, one of the frame body 151 (e.g., a first frame body) and the frame body 152 (e.g., a second frame body) of the actuator 150 may be disposed in the projection lens 140 (not shown in the figure).

Figure 1B:
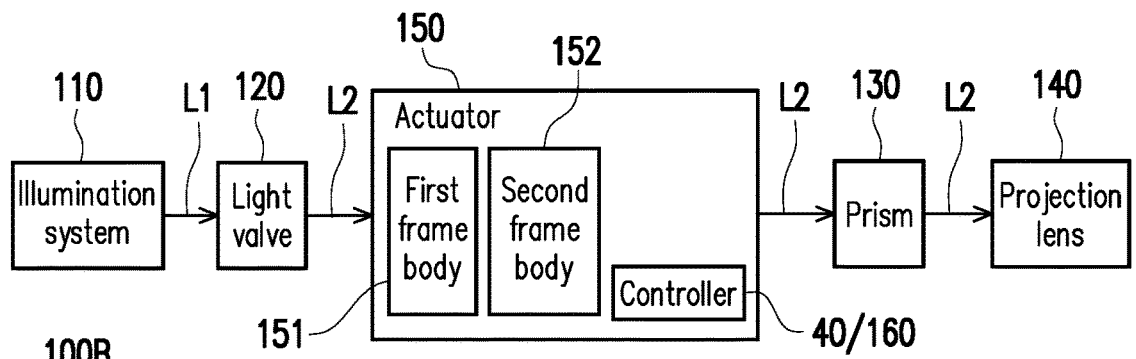
FIG. 1B, FIG. 1C, and FIG. 1D are respectively schematic diagrams showing projection devices according to other embodiments of the disclosure.
Figure 1C:
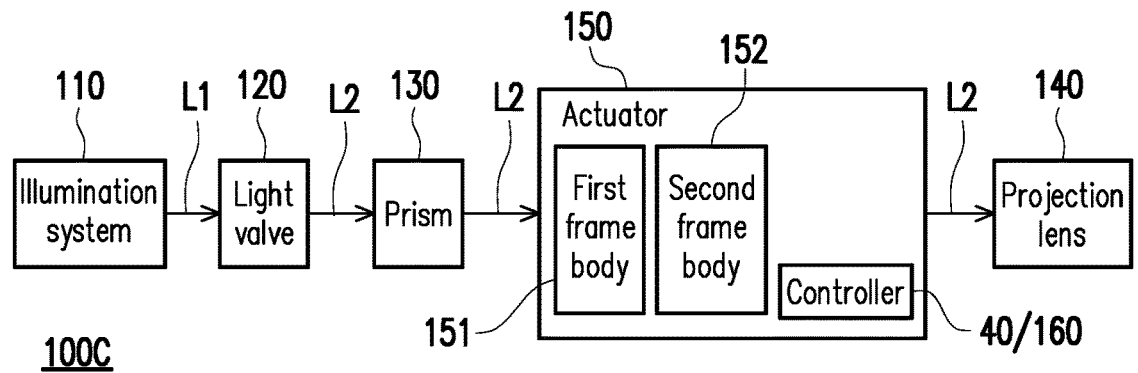
Figure 1D:
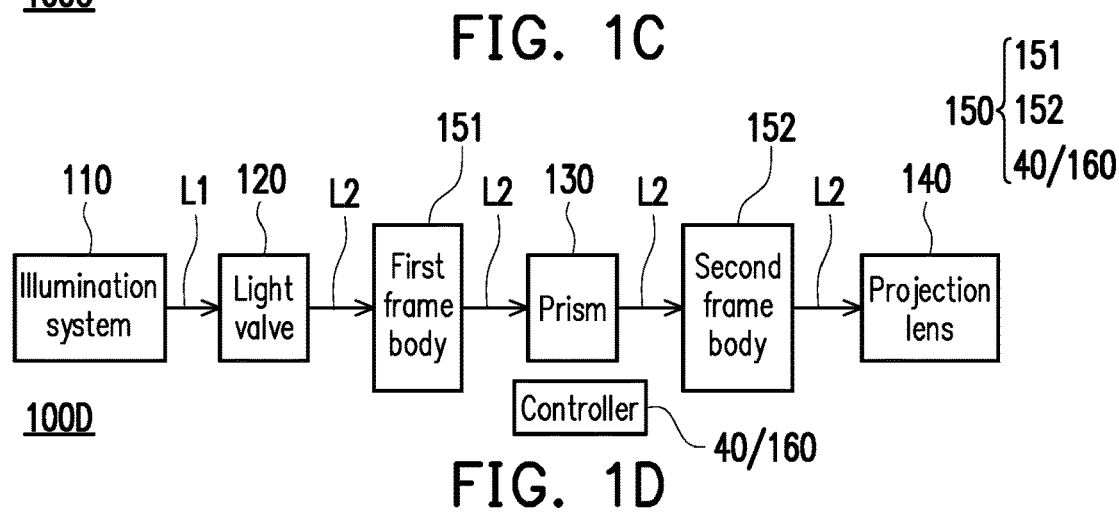

FIG. 1B, FIG. 1C, and FIG. 1D are respectively schematic diagrams showing a projection device 100B, a projection device 100C, and a projection device 100D according to other embodiments of the disclosure. With reference to FIG. 1A to FIG. 1D, the projection device 100B, the projection device 100C, and the projection device 100D of FIG. 1B, FIG. 1C, and FIG. 1D are similar to the projection device 100A of FIG. 1A, and the difference between the projection devices 100B, 100C, and 100D and the projection device 100A are further described as follows. Similar elements will be denoted with the same reference numerals, and will not be repeatedly described herein. In the embodiment of FIG. 1A, the projection device 100A may be non-telecentric. It is possible that the non-telecentric projection device 100A of FIG. 1A does not include a prism. In the embodiments of FIG. 1B, FIG. 1C, and FIG. 1D, the projection devices 100B, 100C, and 100D may be telecentric. Compared with the non-telecentric projection device 100A, the telecentric projection devices 100B, 100C, and 100D may further include a prism 130. The prism 130 of each of the projection devices 100B, 100C, and 100D is located on the transmission path of the image light beam L2, and the prism 130 may be disposed between the light valve 120 and the projection lens 140. In the embodiment of FIG. 1B, the frame body 151 and the frame body 152 of the actuator 150 may be disposed between the light valve 120 and the prism 130. In the embodiment of FIG. 1C, the frame body 151 and the frame body 152 of the actuator 150 may be disposed between the prism 130 and the projection lens 140. In the embodiment of FIG. 1D, the frame body 151 and the frame body 152 of the actuator 150 may be respectively disposed between the light valve 120 and the prism 130 and between the prism 130 and the projection lens 140, and the positions of the frame body 151 and the frame body 152 may be interchanged. In other words, one of the frame body 151 and the frame body 152 may be disposed between the light valve 120 and the prism 130, and the other of the frame body 151 and the frame body 152 may be disposed between the prism 130 and the projection lens 140. In addition, under the architecture of the telecentric projection devices 100C and 100D, in other embodiments not shown, one of the frame body 151 and the frame body 152 of the actuator 150 closer to the projection lens 140 may also be disposed in the projection lens 140.

Figure 2A:
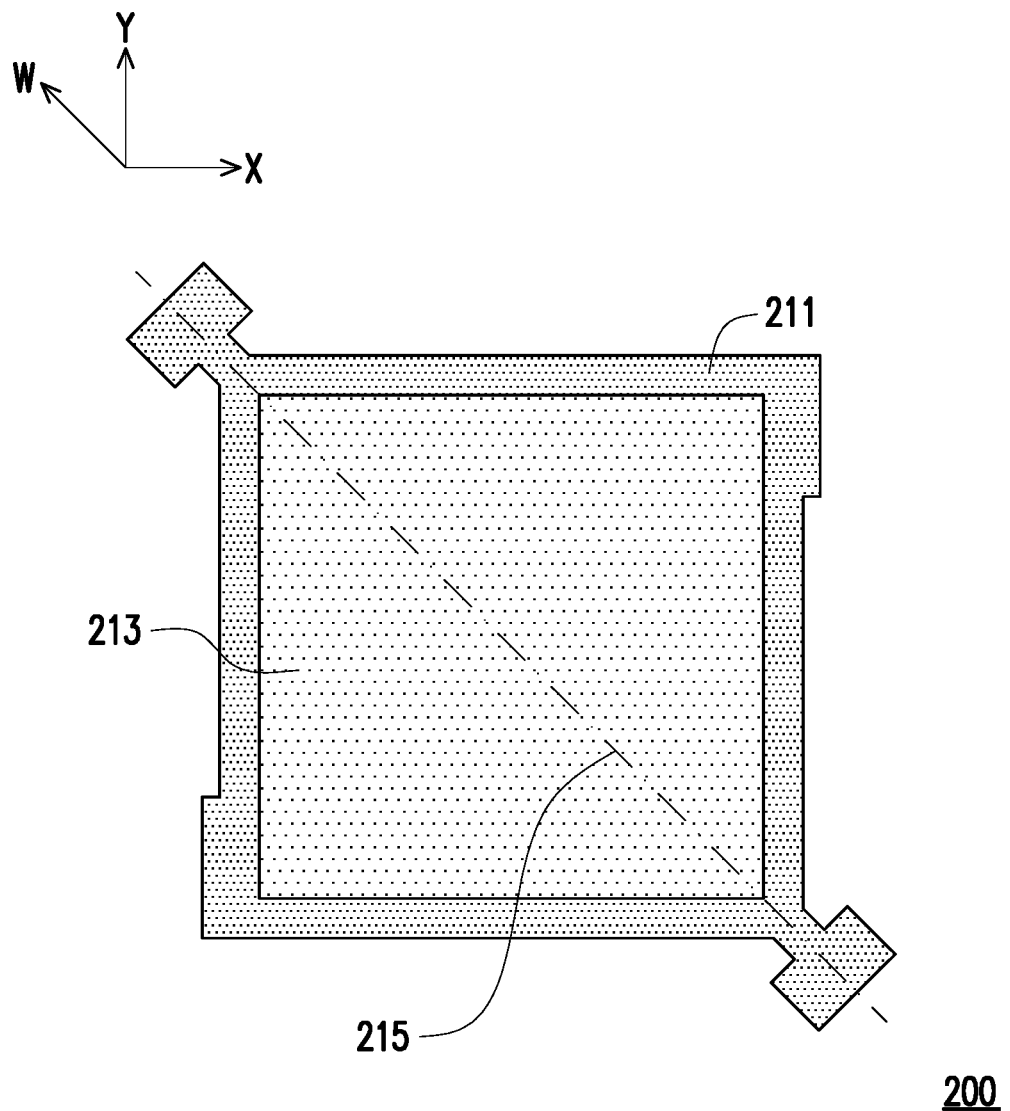
FIG. 2A is a top view showing an actuator having a single axis according to a comparative example of the convention.
Figure 2B:
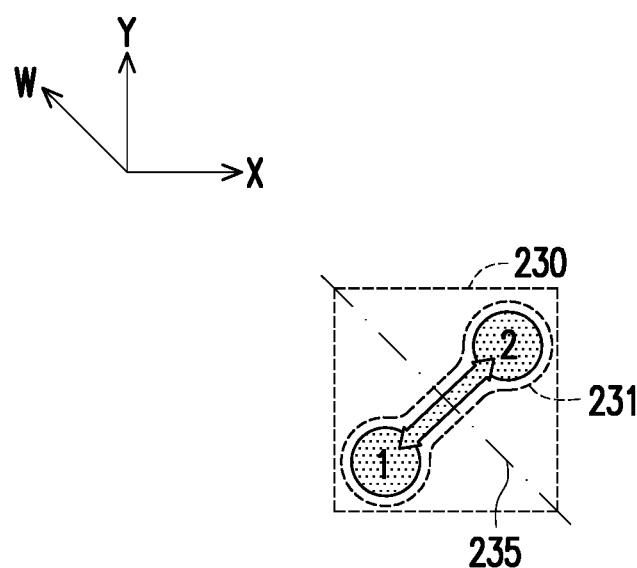
FIG. 2B is a schematic diagram of a pixel corresponding to FIG. 2A.
Figure 2C:
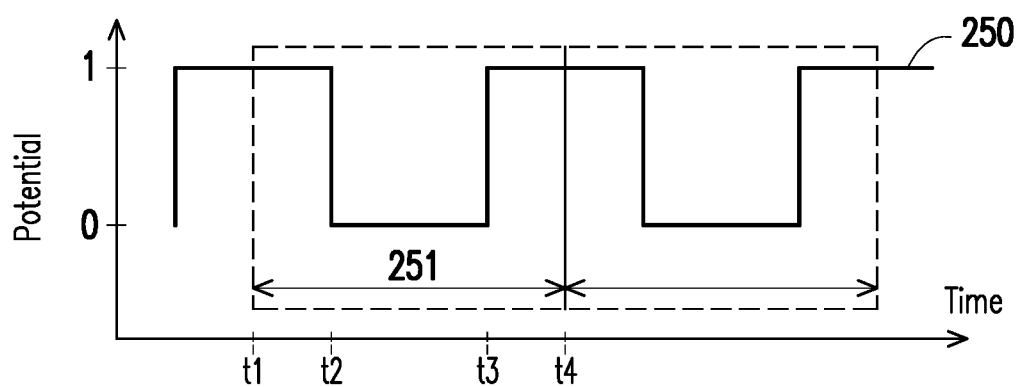
FIG. 2C is a schematic diagram of a driving signal corresponding to FIG. 2A.

In order to facilitate a better understanding of the difference between the art of the disclosure and the convention, comparative examples of the convention are described below. FIG. 2A is a top view showing an actuator 200 having a single axis according to a comparative example of the convention. FIG. 2B is a schematic diagram of a pixel 231 corresponding to FIG. 2A. FIG. 2C is a schematic diagram of a driving signal 250 corresponding to FIG. 2A. The driving signal 250 is, for example, an analog signal or a digital signal. With reference to FIG. 2A, FIG. 2B, and FIG. 2C, the actuator 200 may include a frame body 211 and an optical element 213. The optical element 213 may be disposed in the frame body 211. It is assumed that the actuator 200 has an actuating axis 215 parallel to a W direction, and the W direction may be parallel to an angle bisector between the negative X-axis direction and the Y-axis direction (or an angle bisector between the X-axis direction and the Y-axis direction). The image light beam may be transmitted by the optical element 213 onto an imaginary plane 230 and form a light spot on the imaginary plane 230. When the actuator 200 receives the driving signal 250, the actuator 200 may drive the frame body 211, such that the optical element 213 reciprocally swings based on the actuating axis 215. When the optical element 213 reciprocally swings based on the actuating axis 215, the light spot formed by the image light beam on the imaginary plane 230 may reciprocally move along a radial direction of an axial line 235. The axial line 235 is a projection of the actuating axis 215 on the imaginary plane 230, and the axial line 235 may be parallel to the W direction.

A time interval 251 may be one period for generating the pixel 231. Taking the time interval 251 as an example, at time point t1, the driving signal 250 is maintained at a high potential (indicated by "1"), so the driving signal 250 may not drive the frame body 211, such that the optical element 213 does not swing around the actuating axis 215. Accordingly, the light spot formed by the image light beam on the imaginary plane 230 may stay at position 1. At time point t2, the driving signal 250 changing from a high potential to a low potential (indicated by "0") may drive the frame body 211, such that the optical element 213 swings around the actuating axis 215 in the negative direction (may be regarded as rotating in a counterclockwise direction). Accordingly, the light spot formed by the image light beam on the imaginary plane 230 may move to position 2 along the X-axis direction and the Y-axis direction. At time point t3, the driving signal 250 changing from a low potential to a high potential may drive the frame body 211, such that the optical element 213 swings around the actuating axis 215 in the positive direction (may be regarded as rotating in a clockwise direction). Accordingly, the light spot formed by the image light beam on the imaginary plane 230 may move to position 1 along the negative X-axis direction and the negative Y-axis direction. Based on the above, during the time interval 251, the light spot formed by the image light beam on the imaginary plane 230 may move between position 1 and position 2 to form the pixel 231.

Figure 3A:
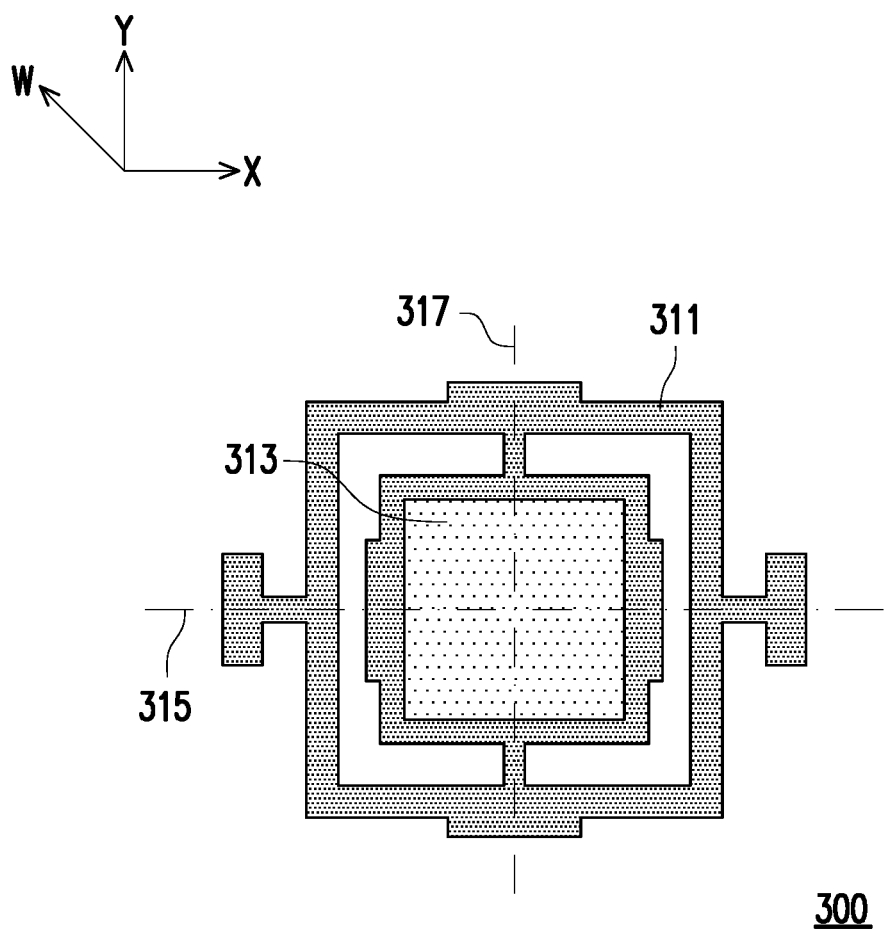
FIG. 3A is a top view showing an actuator having dual axes according to a comparative example of the convention.
Figure 3B:
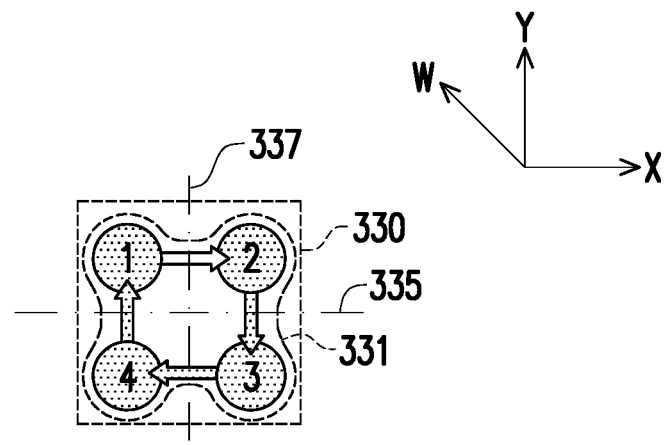
FIG. 3B is a schematic diagram of a pixel corresponding to FIG. 3A.
Figure 3C:
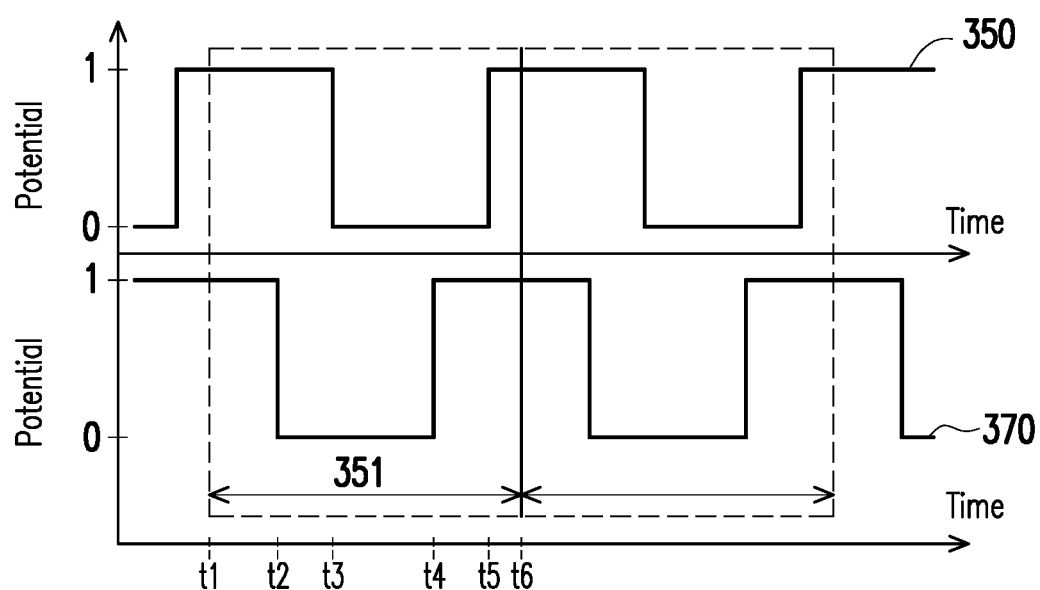
FIG. 3C is a schematic diagram of driving signals corresponding to FIG. 3A.

FIG. 3A is a top view showing an actuator 300 having dual axes according to a comparative example of the convention. FIG. 3B is a schematic diagram of a pixel 331 corresponding to FIG. 3A. FIG. 3C is a schematic diagram of driving signals 350, 370 corresponding to FIG. 3A. The driving signal 350 (or the driving signal 370) is, for example, an analog signal or a digital signal. With reference to FIG. 3A, FIG. 3B, and FIG. 3C, the actuator 300 may include a frame body 311 and an optical element 313. The optical element 313 may be disposed in the frame body 311. It is assumed that the actuator 300 has an actuating axis 315 parallel to the X-axis direction and an actuating axis 317 parallel to the Y-axis direction. The image light beam may be transmitted by the optical element 313 onto an imaginary plane 330 and form a light spot on the imaginary plane 330. When the actuator 300 receives the driving signal 350, the actuator 300 may drive the frame body 311, such that the optical element 313 reciprocally swings based on the actuating axis 315. When the optical element 313 reciprocally swings based on the actuating axis 315, the light spot formed by the image light beam on the imaginary plane 330 may reciprocally move along the radial direction of an axial line 335. The axial line 335 is a projection of the actuating axis 315 on the imaginary plane 330, and the axial line 335 may be parallel to the X-axis direction. On the other hand, when the actuator 300 receives the driving signal 370, the actuator 300 may drive the frame body 311, such that the optical element 313 reciprocally swings based on the actuating axis 317. When the optical element 313 reciprocally swings based on the actuating axis 317, the light spot formed by the image light beam on the imaginary plane 330 may reciprocally move along the radial direction of an axial line 337.

The axial line 337 is a projection of the actuating axis 317 on the imaginary plane 330, and the axial line 337 may be parallel to the Y-axis direction.

The driving signal 350 and the driving signal 370 may have a same frequency. In other words, the swing speed of the optical element 313 reciprocally swinging based on the actuating axis 315 may be the same as the swing speed of the optical element 313 reciprocally swinging based on the actuating axis 317. In addition, a phase of the driving signal 350 may be different from a phase of the driving signal 370. In this embodiment, it is assumed that a phase difference between the driving signal 350 and the driving signal 370 is 90 degrees.

A time interval 351 may be one period for generating the pixel 331. Taking the time interval 351 as an example, at time point t1, the driving signal 350 maintained at a high potential may not drive the frame body 311, such that the optical element 313 does not swing around the actuating axis 315. Accordingly, the light spot formed by the image light beam on the imaginary plane 330 may not move along a radial direction of the axial line 335. On the other hand, the driving signal 370 similarly maintained at a high potential may not drive the frame body 311, such that the optical element 313 does not swing around the actuating axis 317. Accordingly, the light spot formed by the image light beam on the imaginary plane 330 may move in the negative X-axis direction. Therefore, at time point t1, the light spot on the imaginary plane 330 may not move along a radial direction of the axial line 337 and stay at position 1.

At time point t2, the driving signal 350 is maintained at a high potential, so the driving signal 350 may not drive the frame body 311, such that the optical element 313 does not swing around the actuating axis 315. Accordingly, the light spot formed by the image light beam on the imaginary plane 330 may not move along the radial direction of the axial line 335. On the other hand, the driving signal 370 changing from a high potential to a low potential may drive the frame body 311, such that the optical element 313 swings around the actuating axis 317 in the negative direction (may be regarded as rotating in a counterclockwise direction). Accordingly, the light spot formed by the image light beam on the imaginary plane 330 may move in the X-axis direction. Therefore, at time point t2, the light spot on the imaginary plane 330 moves in the X-axis direction and eventually stays at position 2.

At time point t3, the driving signal 350 changing from a high potential to a low potential may drive the frame body 311, such that the optical element 313 swings around the actuating axis 315 in the negative direction. Accordingly, the light spot formed by the image light beam on the imaginary plane 330 may move in the negative Y-axis direction. The driving signal 370 is maintained at a low potential, so the driving signal 370 may not drive the frame body 311, such that the optical element 313 does not swing around the actuating axis 317. Accordingly, the light spot formed by the image light beam on the imaginary plane 330 may not move along the radial direction of the axial line 337. Therefore, at time point t3, the light spot on the imaginary plane 330 moves in the negative Y-axis direction, and eventually stays at position 3.

At time point t4, the driving signal 350 is maintained at a low potential, so the driving signal 350 may not drive the frame body 311, such that the optical element 313 does not swing around the actuating axis 315. Accordingly, the light spot formed by the image light beam on the imaginary plane 330 may not move along the radial direction of the axial line 335. On the other hand, the driving signal 370 changing from a low potential to a high potential may drive the frame body 311, such that the optical element 313 swings around the actuating axis 317 in the positive direction (may be regarded as rotating in a clockwise direction). Accordingly, the light spot formed by the image light beam on the imaginary plane 330 may move in the negative X-axis direction. Therefore, at time point t4, the light spot on the imaginary plane 330 moves in the negative X-axis direction and eventually stays at position 4.

At time point t5, the driving signal 350 changing from a low potential to a high potential may drive the frame body 311, such that the optical element 313 swings around the actuating axis 315 in the positive direction. Accordingly, the light spot formed by the image light beam on the imaginary plane 330 may move in the Y-axis direction. On the other hand, the driving signal 370 is maintained at a high potential, so the driving signal 350 may not drive the frame body 311, such that the optical element 313 does not swing around the actuating axis 317. Accordingly, the light spot formed by the image light beam on the imaginary plane 330 may not move along the radial direction of the axial line 337. Therefore, at time point t5, the light spot on the imaginary plane 330 moves in the Y-axis direction, and eventually stays at position 1.

At time point t6, the driving signal 350 is maintained at a high potential, so the driving signal 370 may not drive the frame body 311, such that the optical element 313 does not swing around the actuating axis 315. Accordingly, the light spot formed by the image light beam on the imaginary plane 330 may not move along the radial direction of the axial line 335. On the other hand, the driving signal 370 is maintained at a high potential, so the driving signal 350 may not drive the frame body 311, such that the optical element 313 does not swing around the actuating axis 317. Accordingly, the light spot formed by the image light beam on the imaginary plane 330 may not move along the radial direction of the axial line 337. Therefore, at time point t6, the light spot on the imaginary plane 330 does not move and stays at position 1.

According to the comparative example of FIG. 2A, FIG. 2B, and FIG. 2C, the single-axis actuator 200 causes the light spot formed by the image light beam on the imaginary plane 230 to move between at most two positions, thereby increasing the resolution of the image light beam. According to the comparative example of FIG. 3A, FIG. 3B, and FIG. 3C, the biaxial actuator 300 causes the light spot formed by the image light beam on the imaginary plane 330 to move between at most four positions, thereby further increasing the resolution of the image light beam. However, at present, the resolution that can be increased by these conventional solutions is limited. If the number of actuating axes of the actuator can be increased, the resolution of the image light beam of the projection device can be further improved.

Figure 4A:
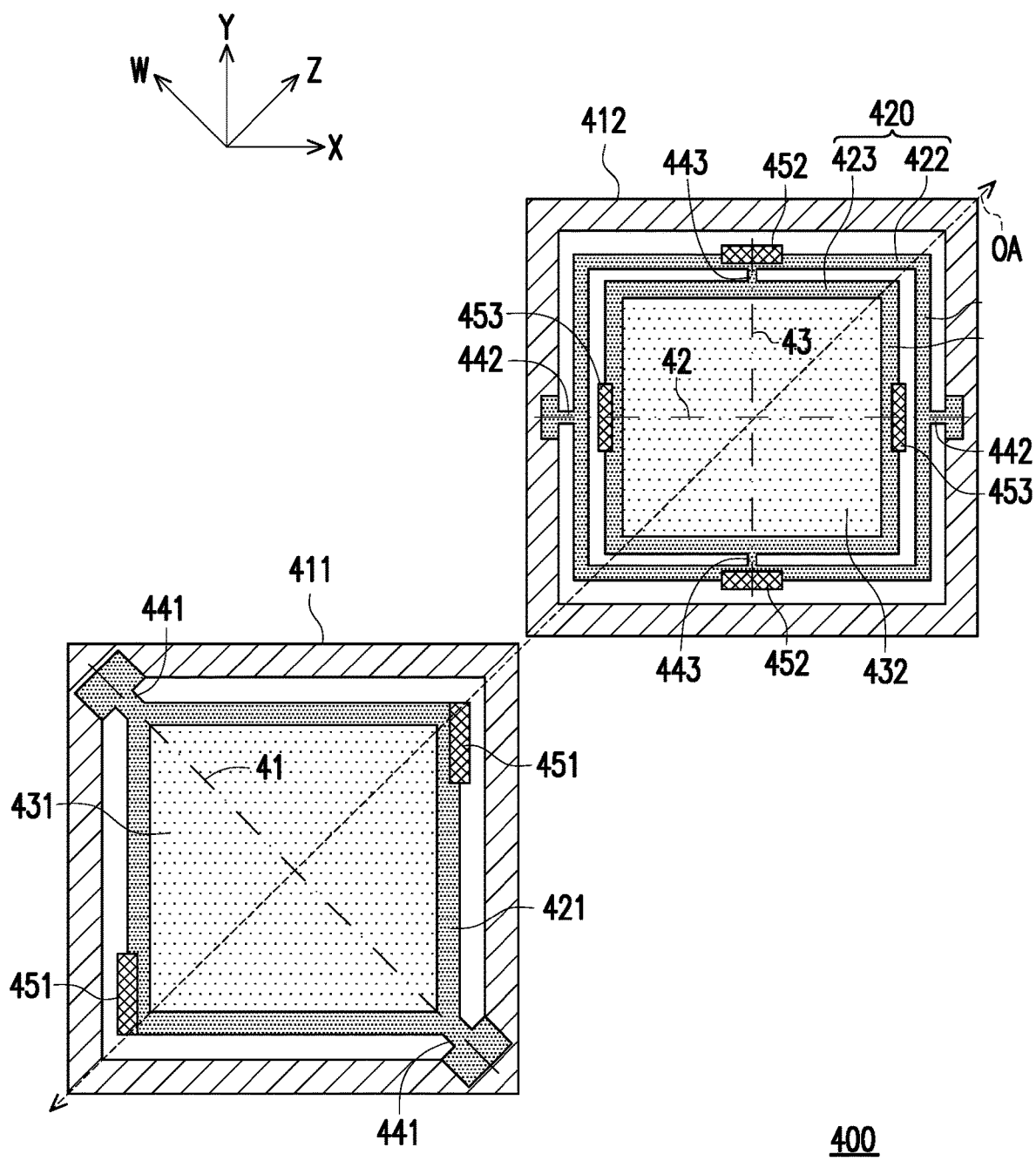
FIG. 4A is a perspective view showing an actuator having three axes according to an embodiment of the disclosure.
Figure 4B:
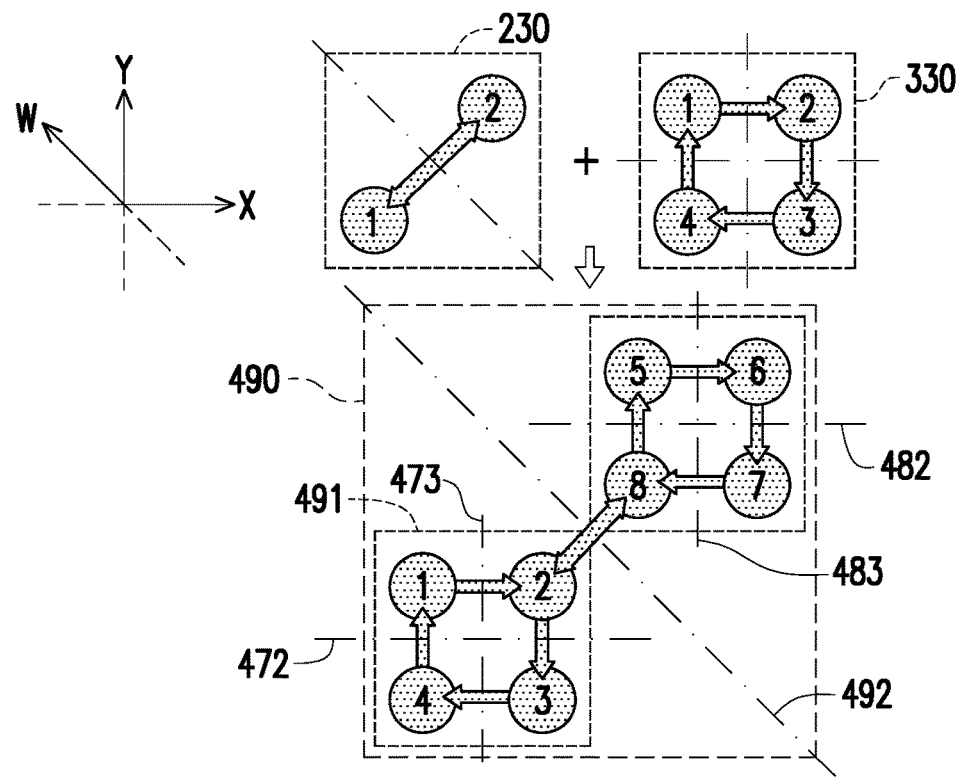
FIG. 4B is a schematic diagram of a pixel corresponding to the actuator of FIG. 4A.
Figure 4C:
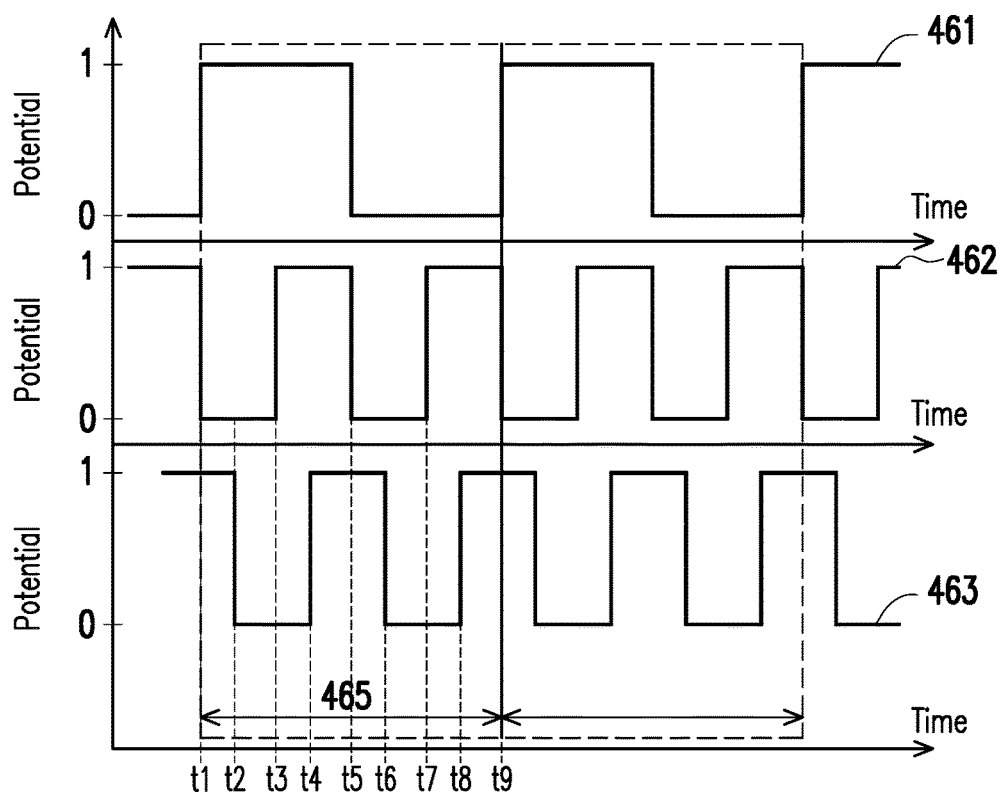
FIG. 4C is a schematic diagram of driving signals corresponding to the actuator of FIG. 4A.

With reference back to FIG. 1A to FIG. 1D, the actuator 150 in FIG. 1A to FIG. 1D is, for example, an actuator 400 having three axes in FIG. 4A. In other words, the actuator 400 of FIG. 4A may be applied to any one of the projection device 100A of FIG. 1A to the projection device 100D of FIG. 1D. Alternatively, part of the actuator 400 of FIG. 4A may also be disposed in the projection lens 140 in FIG. 1A or FIG. 1C or FIG. 1D. The frame body 151 of the actuator 150 is, for example, a frame body 420 of the actuator 400 (e.g., a first frame body), and the frame body 152 of the actuator 150 is, for example, a frame body 421 of the actuator 400 (e.g., a second frame body). FIG. 4A is a perspective view showing an actuator 400 having three axes according to an embodiment of the disclosure. FIG. 4B is a schematic diagram of a pixel 491 corresponding to the actuator 400 of FIG. 4A. FIG. 4C is a schematic diagram of driving signals 461, 462, and 463 corresponding to the actuator 400 of FIG. 4A. The driving signal 461 (or the driving signals 462, 463) is, for example, an analog signal or a digital signal. Reference may be made to FIG. 1A to FIG. 1D, FIG. 4A, FIG. 4B, and FIG. 4C.

The actuator 400 may include a base 411 (e.g., a second base), a base 412 (e.g., a first base), and a controller 40 (shown in FIG. 1A to FIG. 1D). The actuator 400 may also include the frame body 421 (e.g., the second frame body) and an optical element 431 (e.g., a second optical element) corresponding to the base 411. The frame body 421 may be disposed in the base 411, and the optical element 431 may be disposed in the frame body 421. The frame body 421 may be connected to the base 411 through a rotating shaft 441. On the other hand, the actuator 400 may also include the frame body 420 (e.g., the first frame body) and an optical element 432 (e.g., a first optical element) corresponding to the base 412. The frame body 420 may include a moving frame 422 (e.g., a second moving frame) and a moving frame 423 (e.g., a first moving frame). The moving frame 422 may be disposed in the base 412, and may be connected to the base 412 through a rotating shaft 442. The moving frame 423 may be disposed in the moving frame 422, and may be connected to the moving frame 422 through a rotating shaft 443. The optical element 432 may be disposed in the moving frame 423. The optical element 431 and the optical element 432 may are disposed on an optical axis OA of the image light beam. In an embodiment, the optical element 431 (or the optical element 432) may be configured such that the normal of the center point of the optical element 431 (or the optical element 432) coincides with the optical axis OA of the image light beam. In other words, the frame body 421 and the frame body 420 may be overlapped along the direction of the optical axis OA of the image light beam, such that the optical element 431 and the optical element 432 may be overlapped along the direction of the optical axis OA of the image light beam.

The actuator 400 may also include at least one driving assembly disposed between the base 411 and the frame body 421. The at least one driving assembly is, for example, a voice coil motor or a piezoelectric material. The controller 40 (shown in FIG. 1A to FIG. 1D) may be coupled to the at least one driving assembly, and may be configured to control the at least one driving assembly to drive the frame body 421 by a signal (e.g., a second signal), such that the optical element 431 reciprocally swings relative to the base 411 based on an actuating axis 41 (e.g., a third actuating axis). The signal includes the driving signal 461 (e.g., a third driving signal). On the other hand, the actuator 400 may also include at least one driving assembly disposed between the base 412 and the frame body 420. The at least one driving assembly is, for example, a voice coil motor or a piezoelectric material. The controller 40 may be coupled to the at least one driving assembly, and may be configured to control the at least one driving assembly to drive the frame body 420 by a signal (e.g., a first signal), such that the optical element 432 reciprocally swings relative to the base 412 based on an actuating axis 42 (e.g., a second actuating axis) and an actuating axis 43 (e.g., a first actuating axis). The signal includes the driving signal 462 and the driving signal 463 (e.g., a second driving signal and a first driving signal). In this embodiment, assuming that the optical axis OA of the image light beam is parallel to the Z-axis direction, then the actuating axis 42 may be parallel to the X-axis direction, the actuating axis 43 may be parallel to the Y-axis direction, and the actuating axis 41 may be parallel to the W direction, where the W direction may be parallel to the angle bisector between the negative X-axis direction and the Y-axis direction (or the angle bisector between the X-axis direction and the Y-axis direction). In other words, the actuating axis 42 may be perpendicular to the actuating axis 43, and the actuating axis 41 may extend along the angle bisector between the actuating axis 42 and the actuating axis 43.

Specifically, a driving assembly 451 (e.g., a third driving assembly) may be disposed between the base 411 and the frame body 421. The controller 40 may control the driving assembly 451 to drive the frame body 421 by the driving signal 461 (e.g., the third driving signal), such that the optical element 431 reciprocally swings relative to the base 411 based on the actuating axis 41. When the optical element 431 reciprocally swings based on the actuating axis 41, the image light beam passing through the optical element 431 may be transmitted to an imaginary plane 490 to form a light spot moving on the imaginary plane 490, and the movement trajectory of the light spot is similar to the movement trajectory of the light spot in the imaginary plane 230 of FIG. 2B. The number of driving assemblies 451 may be 1, 2, or N (where N is any positive integer). When the number of driving assemblies 451 is two, the two driving assemblies 451 may be respectively disposed on opposite sides of the actuating axis 41.

On the other hand, the at least one driving assembly between the base 412 and the frame body 420 may include a driving assembly 452 (e.g., a second driving assembly) disposed between the base 412 and the moving frame 422. The controller 40 may control the driving assembly 452 to drive the moving frame 422 by the driving signal 462 (e.g., the second driving signal), such that the optical element 432 reciprocally swings relative to the base 412 based on the actuating axis 42. The at least one driving assembly between the base 412 and the frame body 420 may also include a driving assembly 453 (e.g., a first driving assembly) disposed between the moving frame 422 and the moving frame 423. The controller 40 may control the driving assembly 453 to drive the moving frame 423 by the driving signal 463 (e.g., the first driving signal), such that the optical element 432 reciprocally swings relative to the base 412 based on the actuating axis 43. When the optical element 432 reciprocally swings based on the actuating axis 42 and the actuating axis 43, the image light beam passing through the optical element 432 may be transmitted to the imaginary plane 490 to form a light spot moving on the imaginary plane 490, and the movement trajectory of the light spot is similar to the movement trajectory of the light spot in the imaginary plane 330 of FIG. 3B.

The image light beam may be transmitted to the imaginary plane 490 by the optical element 431 and the optical element 432 and form a light spot on the imaginary plane 490. When the optical element 431 reciprocally swings based on the actuating axis 41 and the optical element 432 reciprocally swings based on the actuating axis 42 and the actuating axis 43, the movement trajectory of the light spot in the imaginary plane 490 is similar to an overlap of the movement trajectory of the light spot in the imaginary plane 230 and the movement trajectory of the light spot in the imaginary plane 330. The image light beam passing through the optical element 431 and the optical element 432 may form a light spot on the imaginary plane 490 moving in a sequence from position 1 to position 8. Accordingly, the moving light spot forms the pixel 491.

In an embodiment, the driving assembly 452 may be disposed on the actuating axis 43. The number of driving assemblies 452 may be 1, 2, or N (where N is any positive integer). When the number of driving assemblies 452 is two, the two driving assemblies 452 may be respectively disposed on opposite sides of the moving frame 422. In an embodiment, the driving assembly 453 may be disposed on the actuating axis 42. The number of driving assemblies 453 may be 1, 2, or N (where N is any positive integer). When the number of driving assemblies 453 is two, the two driving assemblies 453 may be respectively disposed on opposite sides of the moving frame 423.

The driving signal 462 and the driving signal 463 may have a same frequency (e.g., a first frequency), and a phase difference between the driving signal 462 and the driving signal 463 may not be zero. For example, the phase difference between the driving signal 462 and the driving signal 463 may be 90 degrees. The frequency of the driving signal 462 (or the driving signal 463) may be different from a frequency (e.g., a second frequency) of the driving signal 461. The frequency of the driving signal 462 (or the driving signal 463) may be an integer multiple of the frequency of the driving signal 461. As shown in FIG. 4C, the frequency of the driving signal 462 (or the driving signal 463) may be 2 times the frequency of the driving signal 461.

A time interval 465 may be one period for generating the pixel 491. Taking the time interval 465 as an example, at time point t1, the driving signal 461 changing from a low potential to a high potential may drive the frame body 421, such that the optical element 431 swings in the positive direction based on the actuating axis 41 (may be regarded as rotating around the actuating axis 41 in a clockwise direction). When the optical element 431 swings in the positive direction based on the actuating axis 41, the light spot formed by the image light beam on the imaginary plane 490 may move in the negative X-axis direction and the negative Y-axis direction along the radial direction of an axial line 492. The axial line 492 may be a projection of the actuating axis 41 on the imaginary plane 490, and the axial line 492 may be parallel to the W direction. The driving signal 462 changing from a high potential to a low potential may drive the moving frame 422, such that the optical element 432 swings in the negative direction based on the actuating axis 42 (may be regarded as rotating around the actuating axis 42 in a counterclockwise direction). When the optical element 432 swings in the negative direction based on the actuating axis 42, the light spot formed by the image light beam on the imaginary plane 490 may move in the Y-axis direction along the radial direction of an axial line 472. The axial line 472 may be an axial line on the imaginary plane 490 relative to the actuating axis 42 when the optical element 431 swings in the positive direction based on the actuating axis 41. The driving signal 463 maintained at a high potential may not drive the moving frame 423, such that the optical element 432 does not swing based on the actuating axis 43. Accordingly, the light spot formed by the image light beam on the imaginary plane 490 may not move along the radial direction of an axial line 473. The axial line 473 may be an axial line on the imaginary plane 490 relative to the actuating axis 43 when the optical element 431 swings in the positive direction based on the actuating axis 41. Based on the above, at time point t1, the light spot formed by the image light beam on the imaginary plane 490 may move to and stay at position 1.

At time point t2, the driving signal 461 is maintained at a high potential, so the driving signal 461 may not drive the frame body 421, such that the optical element 431 does not swing around the actuating axis 41. Accordingly, the light spot formed by the image light beam on the imaginary plane 490 may not move along a radial direction of the axial line 492. The driving signal 462 is maintained at a low potential, so the driving signal 462 may not drive the moving frame 422, such that the optical element 432 does not swing around the actuating axis 42. Accordingly, the light spot formed by the image light beam on the imaginary plane 490 may not move along a radial direction of the axial line 472. The driving signal 463 changing from a high potential to a low potential may drive the moving frame 423, such that the optical element 432 swings in the negative direction based on the actuating axis 43 (may be regarded as rotating around the actuating axis 43 in a counterclockwise direction). When the optical element 432 swings in the negative direction based on the actuating axis 43, the light spot formed by the image light beam on the imaginary plane 490 may move in the X-axis direction along a radial direction of the axial line 473. Based on the above, at time point t2, the light spot formed by the image light beam on the imaginary plane 490 may move to and stay at position 2.

At time point t3, the driving signal 461 is maintained at a high potential, so the driving signal 461 may not drive the frame body 421, such that the optical element 431 does not swing around the actuating axis 41. Accordingly, the light spot formed by the image light beam on the imaginary plane 490 may not move along the radial direction of the axial line 492. The driving signal 462 changing from a low potential to a high potential may drive the moving frame 422, such that the optical element 432 swings in the positive direction based on the actuating axis 42. When the optical element 432 swings in the positive direction based on the actuating axis 42, the light spot formed by the image light beam on the imaginary plane 490 may move in the negative Y-axis direction along the radial direction of the axial line 472. The driving signal 463 is maintained at a low potential, so the driving signal 463 may not drive the moving frame 423, such that the optical element 432 does not swing around the actuating axis 43. Accordingly, the light spot formed by the image light beam on the imaginary plane 490 may not move along the radial direction of the axial line 473. Based on the above, at time point t3, the light spot formed by the image light beam on the imaginary plane 490 may move to and stay at position 3.

At time point t4, the driving signal 461 is maintained at a high potential, so the driving signal 461 may not drive the frame body 421, such that the optical element 431 does not swing around the actuating axis 41. Accordingly, the light spot formed by the image light beam on the imaginary plane 490 may not move along the radial direction of the axial line 492. The driving signal 462 is maintained at a high potential, so the driving signal 462 may not drive the moving frame 422, such that the optical element 432 does not swing around the actuating axis 42. Accordingly, the light spot formed by the image light beam on the imaginary plane 490 may not move along the radial direction of the axial line 472. The driving signal 463 changing from a low potential to a high potential may drive the moving frame 423, such that the optical element 432 swings in the positive direction based on the actuating axis 43. When the optical element 432 swings in the positive direction based on the actuating axis 43, the light spot formed by the image light beam on the imaginary plane 490 may move in the negative X-axis direction along the radial direction of the axial line 473. Based on the above, at time point t4, the light spot formed by the image light beam on the imaginary plane 490 may move to and stay at position 4.

At time point t5, the driving signal 461 changing from a high potential to a low potential may drive the frame body 421, such that the optical element 431 swings in the negative direction based on the actuating axis 41. When the optical element 431 swings in the negative direction based on the actuating axis 41, the light spot formed by the image light beam on the imaginary plane 490 may move in the X-axis direction and the Y-axis direction along the radial direction of the axial line 492. The driving signal 462 changing from a high potential to a low potential may drive the moving frame 422, such that the optical element 432 swings in the negative direction based on the actuating axis 42. When the optical element 432 swings in the negative direction based on the actuating axis 42, the light spot formed by the image light beam on the imaginary plane 490 may move in the Y-axis direction along the radial direction of an axial line 482. The axial line 482 may be an axial line on the imaginary plane 490 relative to the actuating axis 42 when the optical element 431 swings in the negative direction based on the actuating axis 41. The driving signal 463 is maintained at a high potential, so the driving signal 463 may not drive the moving frame 423, such that the optical element 432 does not swing around the actuating axis 43. Accordingly, the light spot formed by the image light beam on the imaginary plane 490 may not move along the radial direction of an axial line 483. The axial line 483 may be an axial line on the imaginary plane 490 relative to the actuating axis 43 when the optical element 431 swings in the negative direction based on the actuating axis 41. Based on the above, at time point t5, the light spot formed by the image light beam on the imaginary plane 490 may move to and stay at position 5.

At time point t6, the driving signal 461 is maintained at a low potential, so the driving signal 461 may not drive the frame body 421, such that the optical element 431 does not swing around the actuating axis 41. Accordingly, the light spot formed by the image light beam on the imaginary plane 490 may not move along the radial direction of the axial line 492. The driving signal 462 is maintained at a low potential, so the driving signal 462 may not drive the moving frame 422, such that the optical element 432 does not swing around the actuating axis 42. Accordingly, the light spot formed by the image light beam on the imaginary plane 490 may not move along a radial direction of the axial line 482. The driving signal 463 changing from a high potential to a low potential may drive the moving frame 423, such that the optical element 432 swings in the negative direction based on the actuating axis 43. When the optical element 432 swings in the negative direction based on the actuating axis 43, the light spot formed by the image light beam on the imaginary plane 490 may move in the positive X-axis direction along a radial direction of the axial line 483. Based on the above, at time point t6, the light spot formed by the image light beam on the imaginary plane 490 may move to and stay at position 6.

At time point t7, the driving signal 461 is maintained at a low potential, so the driving signal 461 may not drive the frame body 421, such that the optical element 431 does not swing around the actuating axis 41. Accordingly, the light spot formed by the image light beam on the imaginary plane 490 may not move along the radial direction of the axial line 492. The driving signal 462 changing from a low potential to a high potential may drive the moving frame 422, such that the optical element 432 swings in the positive direction based on the actuating axis 42. When the optical element 432 swings in the positive direction based on the actuating axis 42, the light spot formed by the image light beam on the imaginary plane 490 may move in the negative Y-axis direction along the radial direction of the axial line 482. The driving signal 463 is maintained at a low potential, so the driving signal 463 may not drive the moving frame 423, such that the optical element 432 does not swing around the actuating axis 43. Accordingly, the light spot formed by the image light beam on the imaginary plane 490 may not move along the radial direction of the axial line 483. Based on the above, at time point t7, the light spot formed by the image light beam on the imaginary plane 490 may move to and stay at position 7.

At time point t8, the driving signal 461 is maintained at a low potential, so the driving signal 461 may not drive the frame body 421, such that the optical element 431 does not swing around the actuating axis 41. Accordingly, the light spot formed by the image light beam on the imaginary plane 490 may not move along the radial direction of the axial line 492. The driving signal 462 is maintained at a high potential, so the driving signal 462 may not drive the moving frame 422, such that the optical element 432 does not swing around the actuating axis 42. Accordingly, the light spot formed by the image light beam on the imaginary plane 490 may not move along the radial direction of the axial line 482. The driving signal 463 changing from a low potential to a high potential may drive the moving frame 423, such that the optical element 432 swings in the positive direction based on the actuating axis 43. When the optical element 432 swings in the positive direction based on the actuating axis 43, the light spot formed by the image light beam on the imaginary plane 490 may move in the negative X-axis direction along the radial direction of the axial line 483. Based on the above, at time point t8, the light spot formed by the image light beam on the imaginary plane 490 may move to and stay at position 8.

At time point t9, the driving signal 461 changing from a low potential to a high potential may drive the frame body 421, such that the optical element 431 swings in the positive direction based on the actuating axis 41. When the optical element 431 swings in the positive direction based on the actuating axis 41, the light spot formed by the image light beam on the imaginary plane 490 may move in the negative X-axis direction and the negative Y-axis direction along the radial direction of the axial line 492. The driving signal 462 changing from a high potential to a low potential may drive the moving frame 422, such that the optical element 432 swings in the negative direction based on the actuating axis 42. When the optical element 432 swings in the negative direction based on the actuating axis 42, the light spot formed by the image light beam on the imaginary plane 490 may move in the Y-axis direction along the radial direction of the axial line 472. The driving signal 463 is maintained at a high potential, so the driving signal 463 may not drive the moving frame 423, such that the optical element 432 does not swing around the actuating axis 43. Accordingly, the light spot formed by the image light beam on the imaginary plane 490 may not move along the radial direction of the axial line 473. Based on the above, at time point t9, the light spot formed by the image light beam on the imaginary plane 490 may return to position 1.

Figure 5A:
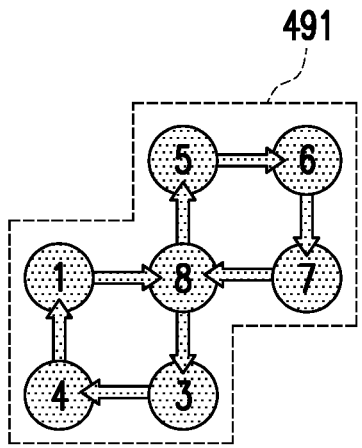
FIG. 5A is a schematic diagram showing a pixel according to an embodiment of the disclosure.

The controller 40 (shown in FIG. 1A to FIG. 1D) may adjust the swing angle of the frame body 421 or the swing angle of the frame body 420 during swinging by at least one driving assembly, thereby changing the appearance of the pixel 491. FIG. 5A is a schematic diagram showing a pixel 491 according to an embodiment of the disclosure. The light spot formed by the image light beam on the imaginary plane 490 may move in a sequence from position 1 to position 8, thereby forming the pixel 491. Since position 2 and position 8 are overlapped, position 2 is not shown in FIG. 5A. On the basis of the pixel of FIG. 5A (reference may be made to FIG. 4A and FIG. 4B for other reference numerals), in this embodiment, the swing angle corresponding to the actuating axis 41 may be $\sqrt{2}$ times the swing angle corresponding to the actuating axis 42, and the swing angle corresponding to the actuating axis 42 may be the same as the swing angle corresponding to the actuating axis 43. Therefore, when an image light beam passes through the optical element 431 and the optical element 432 reciprocally swinging and is transmitted to the imaginary plane 490 to form a light spot moving on the imaginary plane 490, a displacement (e.g., a third displacement) of the light spot in the radial direction (e.g., a third radial direction) of the axial line 492 corresponding to the actuating axis 41 (e.g., the third actuating axis) may be if times a displacement (e.g., a second displacement) of the light spot in the radial direction (e.g., a second radial direction) of the axial line 472 (or the axial line 482) corresponding to the actuating axis 42 (e.g., the second actuating axis). In addition, the displacement (e.g., the third displacement) of the light spot in the radial direction (e.g., the third radial direction) of the axial line 492 corresponding to the actuating axis 41 (e.g., the third actuating axis) may be $\sqrt{2}$ times a displacement (e.g., a first displacement) of the light spot in the radial direction (e.g., a first radial direction) of the axial line 473 (or the axial line 483) corresponding to the actuating axis 43 (e.g., the first actuating axis).

Figure 6A:
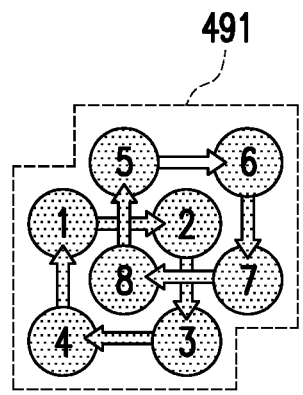
FIG. 6A is a schematic diagram showing a pixel according to another embodiment of the disclosure.

FIG. 6A is a schematic diagram showing a pixel 491 according to another embodiment of the disclosure. The light spot formed by the image light beam on the imaginary plane 490 may move in a sequence from position 1 to position 8, thereby forming the pixel 491. On the basis of the pixel of FIG. 6A (reference may be made to FIG. 4A and FIG. 4B for other reference numerals), in this embodiment, the swing angle corresponding to the actuating axis 41 may be $\sqrt{2}/2$ times the swing angle corresponding to the actuating axis 42, and the swing angle corresponding to the actuating axis 42 may be the same as the swing angle corresponding to the actuating axis 43. Therefore, when an image light beam passes through the optical element 431 and the optical element 432 reciprocally swinging and is transmitted to the imaginary plane 490 to form a light spot moving on the imaginary plane 490, a displacement (e.g., a third displacement) of the light spot in the radial direction (e.g., the third radial direction) of the axial line 492 corresponding to the actuating axis 41 (e.g., the third actuating axis) may be $\sqrt{2}/2$ times a displacement (e.g., a second displacement) of the light spot in the radial direction (e.g., the second radial direction) of the axial line 472 (or the axial line 482) corresponding to the actuating axis 42 (e.g., the second actuating axis). In addition, the displacement (e.g., the third displacement) of the light spot in the radial direction (e.g., the third radial direction) of the axial line 492 corresponding to the actuating axis 41 (e.g., the third actuating axis) may be $\sqrt{2}/2$ times a displacement (e.g., a first displacement) the light spot in the radial direction (e.g., the first radial direction) of the axial line 473 (or the axial line 483) corresponding to the actuating axis 43 (e.g., the first actuating axis).

Figure 7A:
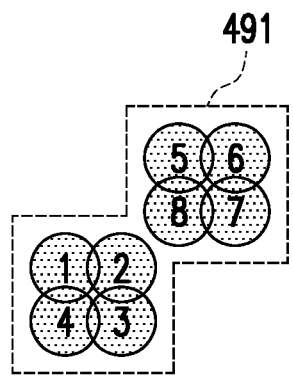
FIG. 7A is a schematic diagram showing a pixel according to yet another embodiment of the disclosure.

FIG. 7A is a schematic diagram showing a pixel 491 according to yet another embodiment of the disclosure. The light spot formed by the image light beam on the imaginary plane 490 may move in a sequence from position 1 to position 8, thereby forming the pixel 491. On the basis of the pixel of FIG. 7A (reference may be made to FIG. 4A and FIG. 4B for other reference numerals), in this embodiment, the swing angle corresponding to the actuating axis 41 may be $2\sqrt{2}$ times the swing angle corresponding to the actuating axis 42, and the swing angle corresponding to the actuating axis 42 may be the same as the swing angle corresponding to the actuating axis 43. Therefore, when an image light beam passes through the optical element 431 and the optical element 432 reciprocally swinging and is transmitted to the imaginary plane 490 to form a light spot moving on the imaginary plane 490, a displacement (e.g., a third displacement) of the light spot in the radial direction (e.g., the third radial direction) of the axial line 492 corresponding to the actuating axis 41 (e.g., the third actuating axis) may be $2\sqrt{2}$ times a displacement (e.g., a second displacement) of the light spot in the radial direction (e.g., the second radial direction) of the axial line 472 (or the axial line 482) corresponding to the actuating axis 42 (e.g., the second actuating axis). In addition, the displacement (e.g., the third displacement) of the light spot in the radial direction (e.g., the third radial direction) of the axial line 492 corresponding to the actuating axis 41 (e.g., the third actuating axis) may be $2\sqrt{2}$ times a displacement (e.g., a first displacement) of the light spot in the radial direction (e.g., the first radial direction) of the axial line 473 (or the axial line 483) corresponding to the actuating axis 43 (e.g., the first actuating axis).

Figure 5B:
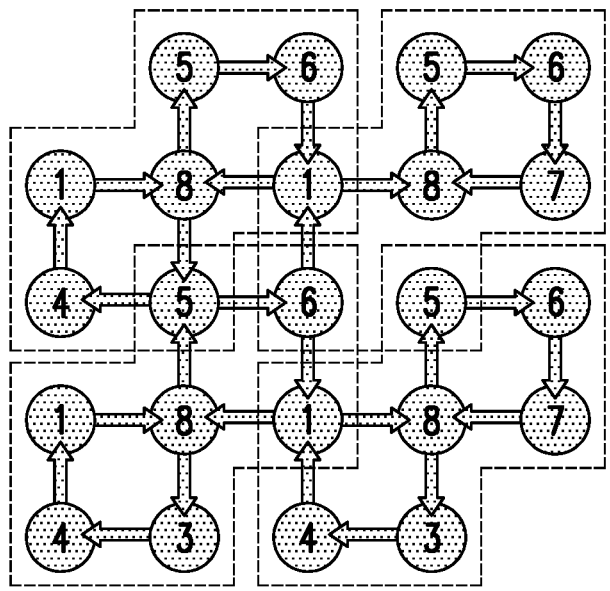
FIG. 5B is a diagram showing layout of a plurality of pixels corresponding to FIG. 5A.
Figure 6B:
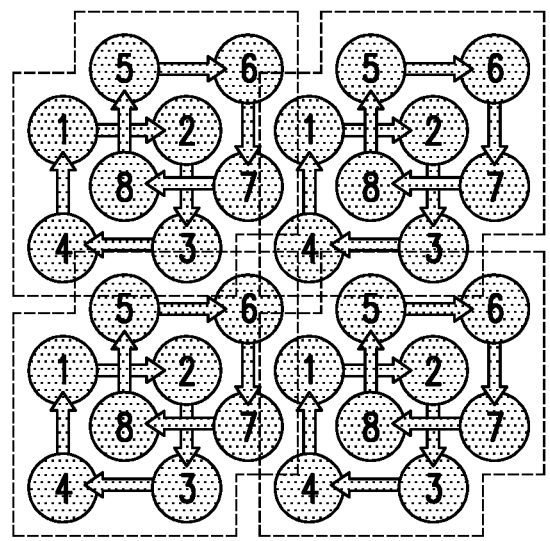
FIG. 6B is a diagram showing layout of a plurality of pixels corresponding to FIG. 6A.
Figure 7B:
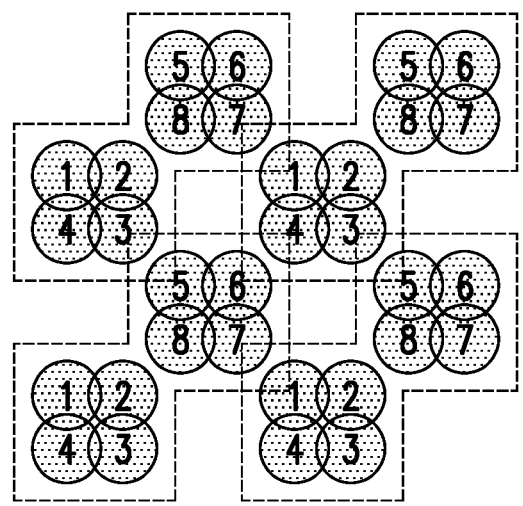
FIG. 7B is a diagram showing layout of a plurality of pixels corresponding to FIG. 7A.

FIG. 5B is a diagram showing layout of a plurality of pixels 491 corresponding to FIG. 5A. FIG. 6B is a diagram showing layout of a plurality of pixels 491 corresponding to FIG. 6A. FIG. 7B is a diagram showing layout of a plurality of pixels 491 corresponding to FIG. 7A. According to FIG. 5B, FIG. 6B, and FIG. 7B, the layout generated by the plurality of pixels 491 shown in FIG. 6B can have a greater pixel density.

Figure 8A:
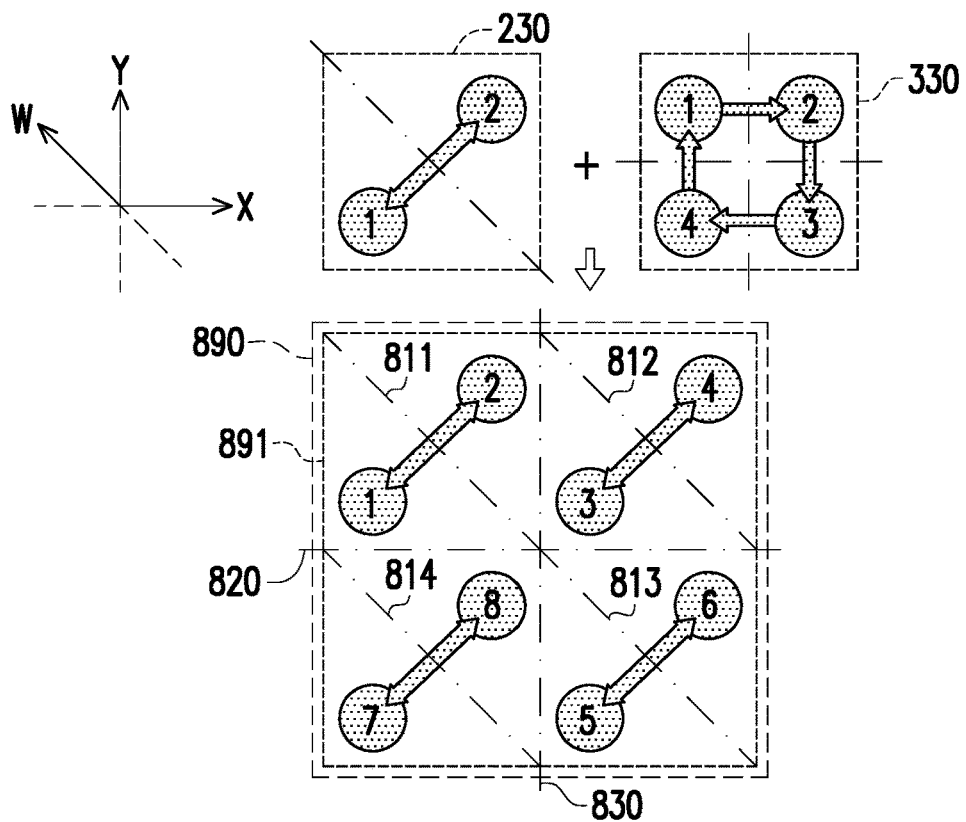
FIG. 8A is a schematic diagram of a pixel corresponding to the actuator of FIG. 4A.
Figure 8B:
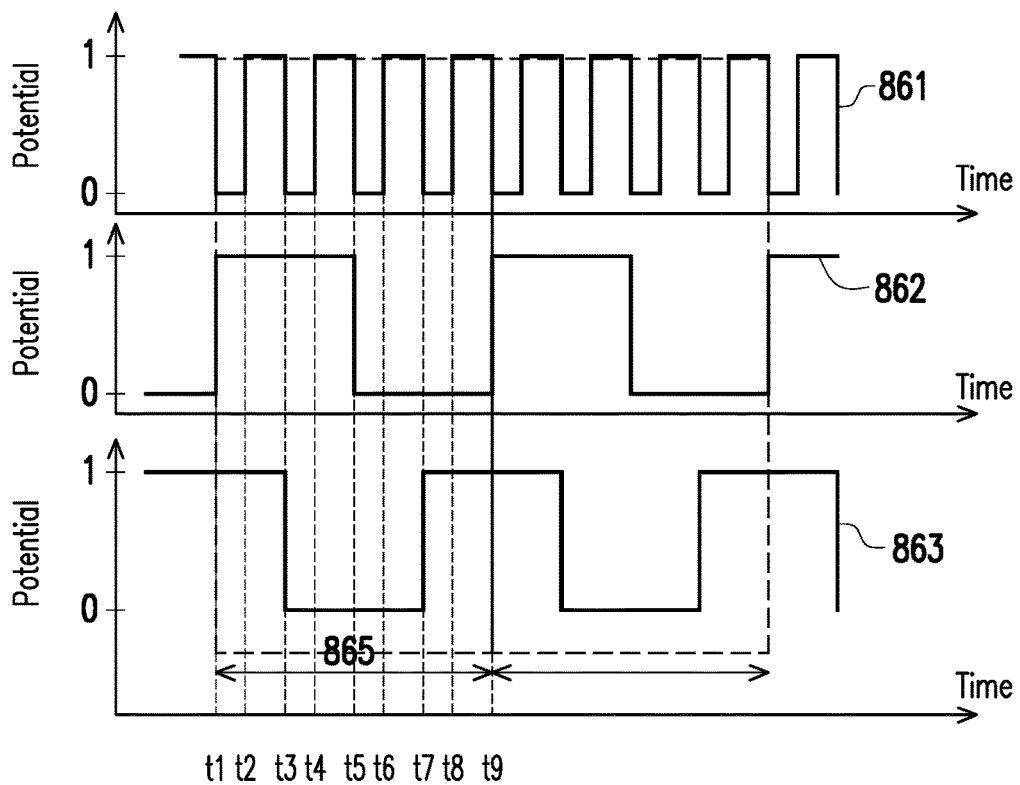
FIG. 8B is a schematic diagram of driving signals corresponding to the actuator of FIG. 4A.

FIG. 8A is a schematic diagram of a pixel 891 corresponding to the actuator 400 of FIG. 4A. FIG. 8B is a schematic diagram of driving signals 861, 862 and 863 corresponding to the actuator 400 of FIG. 4A. The driving signal 861 (or the driving signals 862, 863) is, for example, an analog signal or a digital signal. With reference to FIG. 1A to FIG. 1D, FIG. 4A, FIG. 8A, and FIG. 8B, in this embodiment, the driving signal 861 (e.g., a third driving signal) may be configured to control the driving assembly 451 to drive the frame body 421, such that the optical element 431 reciprocally swings based on the actuating axis 41. The driving signal 862 (e.g., a second driving signal) may be configured to control the driving assembly 452 to drive the moving frame 422, such that the optical element 432 reciprocally swings based on the actuating axis 42. The driving signal 863 (e.g., a first driving signal) may be configured to control the driving assembly 453 to drive the moving frame 423, such that the optical element 432 reciprocally swings based on the actuating axis 43. The driving signal 862 and the driving signal 863 may have a same frequency (e.g., a first frequency), and a phase difference between the driving signal 862 and the driving signal 863 may not be zero. For example, the phase difference between the driving signal 862 and the driving signal 863 may be 90 degrees. A frequency (e.g., a second frequency) of the driving signal 861 may be different from the frequency of the driving signal 862 (or the driving signal 863). The frequency of the driving signal 861 may be an integer multiple of the frequency of the driving signal 862 (or the driving signal 863). As shown in FIG. 8B, the frequency of the driving signal 861 may be 4 times the frequency of the driving signal 862 (or the driving signal 863).

A time interval 865 may be one period for generating the pixel 891. Take the time interval 865 as an example, at time point t1, the driving signal 862 changing from a low potential to a high potential may drive the moving frame 422, such that the optical element 432 swings in the positive direction based on the actuating axis 42 (may be regarded as rotating around the actuating axis 42 in a clockwise direction). When the optical element 432 swings in the positive direction based on the actuating axis 42, the light spot formed by the image light beam on an imaginary plane 890 may move in the Y-axis direction along the radial direction of an axial line 820. The axial line 820 may be a projection of the actuating axis 42 on the imaginary plane 890, and the axial line 820 may be parallel to the X-axis direction. The driving signal 863 maintained at a high potential may not drive the moving frame 423, such that the optical element 432 does not swing based on the actuating axis 43. Accordingly, the light spot formed by the image light beam on the imaginary plane 890 may not move along the radial direction of an axial line 830. The axial line 830 may be a projection of the actuating axis 43 on the imaginary plane 890, and the axial line 830 may be parallel to the Y-axis direction. The driving signal 861 changing from a high potential to a low potential may drive the frame body 421, such that the optical element 431 swings in the negative direction based on the actuating axis 41 (may be regarded as rotating around the actuating axis 41 in a counterclockwise direction). When the optical element 431 swings in the negative direction based on the actuating axis 41, the light spot formed by the image light beam on the imaginary plane 890 may move in the negative X-axis direction and the negative Y-axis direction along the radial direction of an axial line 811. The axial line 811 may be an axial line on the imaginary plane 890 relative to the actuating axis 41 when the optical element 432 swings in the positive direction based on the actuating axis 42 and the positive direction based on the actuating axis 43. Based on the above, at time point t1, the light spot formed by the image light beam on the imaginary plane 890 may move to and stay at position 1.

During the time interval 865, at time point t2, the driving signal 862 is maintained at a high potential, so the driving signal 862 may not drive the moving frame 422, such that the optical element 432 does not swing around the actuating axis 42. Accordingly, the light spot formed by the image light beam on the imaginary plane 890 may not move along a radial direction of the axial line 820. The driving signal 863 is maintained at a high potential, so the driving signal 863 may not drive the moving frame 423, such that the optical element 432 does not swing around the actuating axis 43. Accordingly, the light spot formed by the image light beam on the imaginary plane 890 may not move along a radial direction of the axial line 830. The driving signal 861 changing from a low potential to a high potential may drive the frame body 421, such that the optical element 431 swings in the positive direction based on the actuating axis 41. When the optical element 431 swings in the positive direction based on the actuating axis 41, the light spot formed by the image light beam on the imaginary plane 890 may move in the X-axis direction and the Y-axis direction along a radial direction of the axial line 811. Based on the above, at time point t2, the light spot formed by the image light beam on the imaginary plane 890 may move to and stay at position 2.

At time point t3, the driving signal 862 is maintained at a high potential, so the driving signal 862 may not drive the moving frame 422, such that the optical element 432 does not swing around the actuating axis 42. Accordingly, the light spot formed by the image light beam on the imaginary plane 890 may not move along the radial direction of the axial line 820. The driving signal 863 changing from a high potential to a low potential may drive the moving frame 423, such that the optical element 432 swings in the negative direction based on the actuating axis 43 (may be regarded as rotating around the actuating axis 43 in a counterclockwise direction). When the optical element 432 swings in the negative direction based on the actuating axis 43, the light spot formed by the image light beam on the imaginary plane 890 may move in the X-axis direction along the radial direction of the axial line 830. The driving signal 861 changing from a high potential to a low potential may drive the frame body 421, such that the optical element 431 swings in the negative direction based on the actuating axis 41. When the optical element 431 swings in the negative direction based on the actuating axis 41, the light spot formed by the image light beam on the imaginary plane 890 may move in the negative X-axis direction and the negative Y-axis direction along the radial direction of an axial line 812. The axial line 812 may be an axial line on the imaginary plane 890 relative to the actuating axis 41 when the optical element 432 swings in the positive direction based on the actuating axis 42 and the negative direction based on the actuating axis 43. Based on the above, at time point t3, the light spot formed by the image light beam on the imaginary plane 890 may move to and stay at position 3.

At time point t4, the driving signal 862 is maintained at a high potential, so the driving signal 862 may not drive the moving frame 422, such that the optical element 432 does not swing around the actuating axis 42. Accordingly, the light spot formed by the image light beam on the imaginary plane 890 may not move along the radial direction of the axial line 820. The driving signal 863 is maintained at a low potential, so the driving signal 863 may not drive the moving frame 423, such that the optical element 432 does not swing around the actuating axis 43. Accordingly, the light spot formed by the image light beam on the imaginary plane 890 may not move along the radial direction of the axial line 830. The driving signal 861 changing from a low potential to a high potential may drive the frame body 421, such that the optical element 431 swings in the positive direction based on the actuating axis 41. When the optical element 431 swings in the positive direction based on the actuating axis 41, the light spot formed by the image light beam on the imaginary plane 890 may move in the X-axis direction and the Y-axis direction along a radial direction of the axial line 812. Based on the above, at time point t4, the light spot formed by the image light beam on the imaginary plane 890 may move to and stay at position 4.

At time point t5, the driving signal 862 changing from a high potential to a low potential may drive the moving frame 422, such that the optical element 432 swings in the negative direction based on the actuating axis 42. When the optical element 432 swings in the negative direction based on the actuating axis 42, the light spot formed by the image light beam on the imaginary plane 890 may move in the negative Y-axis direction along the radial direction of the axial line 820. The driving signal 863 is maintained at a low potential, so the driving signal 863 may not drive the moving frame 423, such that the optical element 432 does not swing around the actuating axis 43. Accordingly, the light spot formed by the image light beam on the imaginary plane 890 may not move along the radial direction of the axial line 830. The driving signal 861 changing from a high potential to a low potential may drive the frame body 421, such that the optical element 431 swings in the negative direction based on the actuating axis 41. When the optical element 431 swings in the negative direction based on the actuating axis 41, the light spot formed by the image light beam on the imaginary plane 890 may move in the negative X-axis direction and the negative Y-axis direction along the radial direction of an axial line 813. The axial line 813 may be a projection of the optical element 431 on the imaginary plane 890 relative to the actuating axis 41 when the optical element 431 swings in the negative direction based on the actuating axis 42 and the negative direction based on the actuating axis 43. Based on the above, at time point t5, the light spot formed by the image light beam on the imaginary plane 890 may move to and stay at position 5.

At time point t6, the driving signal 862 is maintained at a low potential, so the driving signal 862 may not drive the moving frame 422, such that the optical element 432 does not swing around the actuating axis 42. Accordingly, the light spot formed by the image light beam on the imaginary plane 890 may not move along the radial direction of the axial line 820. The driving signal 863 is maintained at a low potential, so the driving signal 863 may not drive the moving frame 423, such that the optical element 432 does not swing around the actuating axis 43. Accordingly, the light spot formed by the image light beam on the imaginary plane 890 may not move along the radial direction of the axial line 830. The driving signal 861 changing from a low potential to a high potential may drive the frame body 421, such that the optical element 431 swings in the positive direction based on the actuating axis 41. When the optical element 431 swings in the positive direction based on the actuating axis 41, the light spot formed by the image light beam on the imaginary plane 890 may move in the X-axis direction and the Y-axis direction along a radial direction of the axial line 813. Based on the above, at time point t6, the light spot formed by the image light beam on the imaginary plane 890 may move to and stay at position 6.

At time point t7, the driving signal 862 is maintained at a low potential, so the driving signal 862 may not drive the moving frame 422, such that the optical element 432 does not swing around the actuating axis 42. Accordingly, the light spot formed by the image light beam on the imaginary plane 890 may not move along the radial direction of the axial line 820. The driving signal 863 changing from a low potential to a high potential may drive the moving frame 423, such that the optical element 432 swings in the positive direction based on the actuating axis 43. When the optical element 432 swings in the positive direction based on the actuating axis 43, the light spot formed by the image light beam on the imaginary plane 890 may move in the negative X-axis direction along the radial direction of the axial line 830. The driving signal 861 changing from a high potential to a low potential may drive the frame body 421, such that the optical element 431 swings in the negative direction based on the actuating axis 41. When the optical element 431 swings in the negative direction based on the actuating axis 41, the light spot formed by the image light beam on the imaginary plane 890 may move in the negative X-axis direction and the negative Y-axis direction along the radial direction of an axial line 814. The axial line 814 may be an axial line on the imaginary plane 890 relative to the actuating axis 41 when the optical element 432 swings in the negative direction based on the actuating axis 42 and the positive direction based on the actuating axis 43. Based on the above, at time point t7, the light spot formed by the image light beam on the imaginary plane 890 may move to and stay at position 7.

At time point t8, the driving signal 862 is maintained at a low potential, so the driving signal 862 may not drive the moving frame 422, such that the optical element 432 does not swing around the actuating axis 42. Accordingly, the light spot formed by the image light beam on the imaginary plane 890 may not move along the radial direction of the axial line 820. The driving signal 863 is maintained at a high potential, so the driving signal 863 may not drive the moving frame 423, such that the optical element 432 does not swing around the actuating axis 43. Accordingly, the light spot formed by the image light beam on the imaginary plane 890 may not move along the radial direction of the axial line 830. The driving signal 861 changing from a low potential to a high potential may drive the frame body 421, such that the optical element 431 swings in the positive direction based on the actuating axis 41. When the optical element 431 swings in the positive direction based on the actuating axis 41, the light spot formed by the image light beam on the imaginary plane 890 may move in the X-axis direction and the Y-axis direction along a radial direction of the axial line 814. Based on the above, at time point t8, the light spot formed by the image light beam on the imaginary plane 890 may move to and stay at position 8.

At time point t9, the driving signal 862 changing from a low potential to a high potential may drive the moving frame 422, such that the optical element 432 swings in the positive direction based on the actuating axis 42. When the optical element 432 swings in the positive direction based on the actuating axis 42, the light spot formed by the image light beam on the imaginary plane 890 may move in the Y-axis direction along the radial direction of the axial line 820. The driving signal 863 is maintained at a low potential, so the driving signal 863 may not drive the moving frame 423, such that the optical element 432 does not swing around the actuating axis 43. Accordingly, the light spot formed by the image light beam on the imaginary plane 890 may not move along the radial direction of the axial line 830. The driving signal 861 changing from a high potential to a low potential may drive the frame body 421, such that the optical element 431 swings in the negative direction based on the actuating axis 41. When the optical element 431 swings in the negative direction based on the actuating axis 41, the light spot formed by the image light beam on the imaginary plane 890 may move in the negative X-axis direction and the negative Y-axis direction along the radial direction of the axial line 811. Based on the above, at time point t9, the light spot formed by the image light beam on the imaginary plane 890 may return to position 1.

Figure 9A:
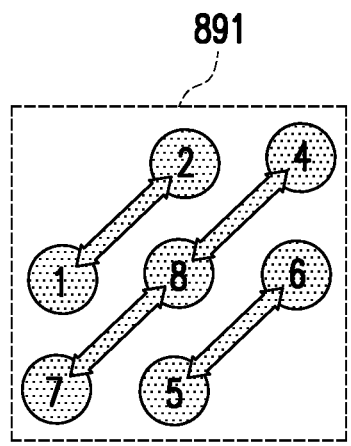
FIG. 9A is a schematic diagram showing a pixel according to an embodiment of the disclosure.

The controller 40 (shown in FIG. 1A to FIG. 1D) may adjust the swing angle of the frame body 421 or the swing angle of the frame body 420 during swinging by at least one driving assembly, thereby changing the appearance of the pixel 891. FIG. 9A is a schematic diagram showing a pixel 891 according to an embodiment of the disclosure. The light spot formed by the image light beam on the imaginary plane 890 may move in a sequence from position 1 to position 8, thereby forming the pixel 891. On the basis of the pixel of FIG. 9A (reference may be made to FIG. 4A and FIG. 8A for other reference numerals), in this embodiment, the swing angle corresponding to the actuating axis 41 may be $\sqrt{2}$ times the swing angle corresponding to the actuating axis 42, and the swing angle corresponding to the actuating axis 42 may be the same as the swing angle corresponding to the actuating axis 43. Therefore, when an image light beam passes through the optical element 431 and the optical element 432 reciprocally swinging and is transmitted to the imaginary plane 890 to form a light spot moving on the imaginary plane 890, a displacement (e.g., a third displacement) of the light spot in the radial direction (e.g., a third radial direction) of the axial line 811 (or the axial line 812, the axial line 813, and the axial line 814) corresponding to the actuating axis 41 (e.g., the third actuating axis) may be $\sqrt{2}$ times a displacement (e.g., a second displacement) of the light spot in the radial direction (e.g., a second radial direction) of the axial line 820 corresponding to the actuating axis 42 (e.g., the second actuating axis). In addition, the displacement (e.g., the third displacement) of the light spot in the radial direction (e.g., the third radial direction) of the axial line 811 (or the axial line 812, the axial line 813, and the axial line 814) corresponding to the actuating axis 41 (e.g., the third actuating axis) may be $\sqrt{2}$ times a displacement (e.g., a first displacement) of the light spot in the radial direction (e.g., a first radial direction) of the axial line 830 corresponding to the actuating axis 43 (e.g., the first actuating axis).

Figure 10A:
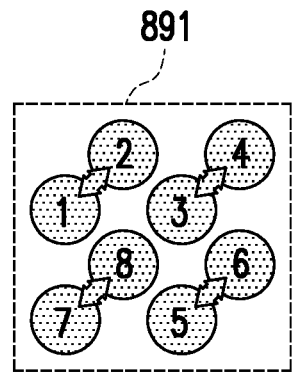
FIG. 10A is a schematic diagram showing a pixel according to still another embodiment of the disclosure.

FIG. 10A is a schematic diagram showing a pixel 891 according to still another embodiment of the disclosure. The light spot formed by the image light beam on the imaginary plane 890 may move in a sequence from position 1 to position 8, thereby forming the pixel 891. On the basis of the pixel of FIG. 10A (reference may be made to FIG. 4A and FIG. 8A for other reference numerals), in this embodiment, the swing angle corresponding to the actuating axis 41 may be $\sqrt{2}/2$ times the swing angle corresponding to the actuating axis 42, and the swing angle corresponding to the actuating axis 42 may be the same as the swing angle corresponding to the actuating axis 43. Therefore, when an image light beam passes through the optical element 431 and the optical element 432 reciprocally swinging and is transmitted to the imaginary plane 890 to form a light spot moving on the imaginary plane 890, a displacement (e.g., a third displacement) of the light spot in the radial direction (e.g., the third radial direction) of the axial line 811 (or the axial line 812, the axial line 813, and the axial line 814) corresponding to the actuating axis 41 (e.g., the third actuating axis) may be $\sqrt{2}/2$ times a displacement (e.g., a second displacement) of the light spot in the radial direction (e.g., the second radial direction) of the axial line 820 corresponding to the actuating axis 42 (e.g., the second actuating axis). In addition, the displacement (e.g., the third displacement) of the light spot in the radial direction (e.g., the third radial direction) of the axial line 811 (or the axial line 812, the axial line 813, and the axial line 814) corresponding to the actuating axis 41 (e.g., the third actuating axis) may be $\sqrt{2}/2$ times a displacement (e.g., a first displacement) of the light spot in the radial direction (e.g., the first radial direction) of the axial line 830 corresponding to the actuating axis 43 (e.g., the first actuating axis).

Figure 11A:
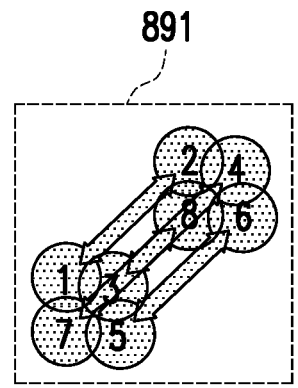
FIG. 11A is a schematic diagram showing a pixel according to yet another embodiment of the disclosure.

FIG. 11A is a schematic diagram showing a pixel 891 according to yet another embodiment of the disclosure. The light spot formed by the image light beam on the imaginary plane 890 may move in a sequence from position 1 to position 8, thereby forming the pixel 891. On the basis of the pixel of FIG. 11A (reference may be made to FIGS. 4A and 8A for other reference numerals), in this embodiment, the swing angle corresponding to the actuating axis 41 may be $2\sqrt{2}$ times the swing angle corresponding to the actuating axis 42, and the swing angle corresponding to the actuating axis 42 may be the same as the swing angle corresponding to the actuating axis 43. Therefore, when an image light beam passes through the optical element 431 and the optical element 432 reciprocally swinging and is transmitted to the imaginary plane 890 to form a light spot moving on the imaginary plane 890, a displacement (e.g., a third displacement) of the light spot in the radial direction (e.g., the third radial direction) of the axial line 811 (or the axial line 812, the axial line 813, and the axial line 814) corresponding to the actuating axis 41 (e.g., the third actuating axis) may be $2\sqrt{2}$ times a displacement (e.g., a second displacement) of the light spot in the radial direction (e.g., the second radial direction) of the axial line 820 corresponding to the actuating axis 42 (e.g., the second actuating axis). In addition, the displacement (e.g., the third displacement) of the light spot in the radial direction (e.g., the third radial direction) of the axial line 811 (or the axial line 812, the axial line 813, and the axial line 814) corresponding to the actuating axis 41 (e.g., the third actuating axis) may be $2\sqrt{2}$ times a displacement (e.g., a first displacement) of the light spot in the radial direction (e.g., the first radial direction) of the axial line 830 corresponding to the actuating axis 43 (e.g., the first actuating axis).

Figure 9B:
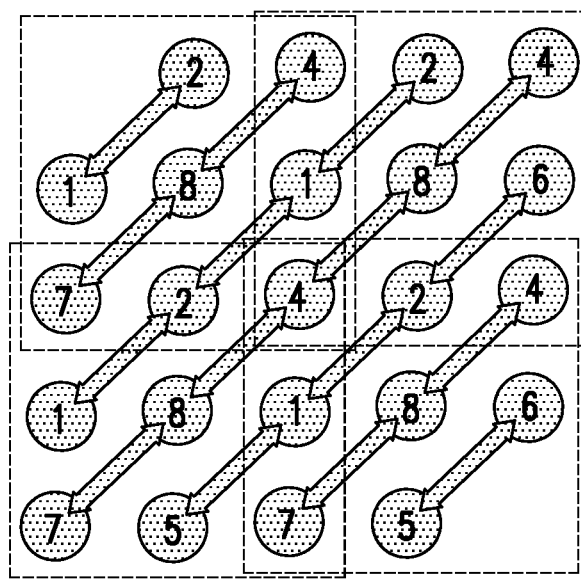
FIG. 9B is a diagram showing layout of a plurality of pixels corresponding to FIG. 9A.
Figure 10B:
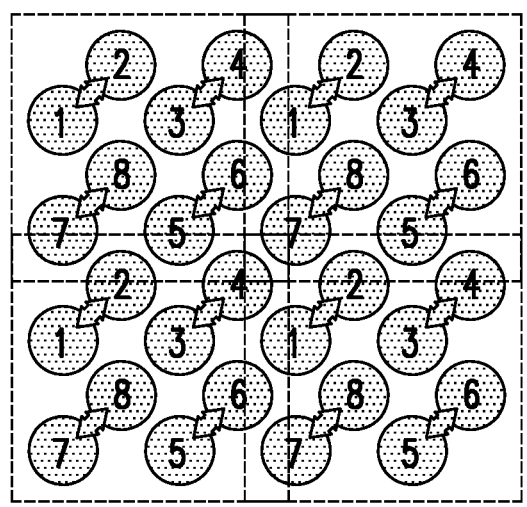
FIG. 10B is a diagram showing layout of a plurality of pixels corresponding to FIG. 10A.
Figure 11B:
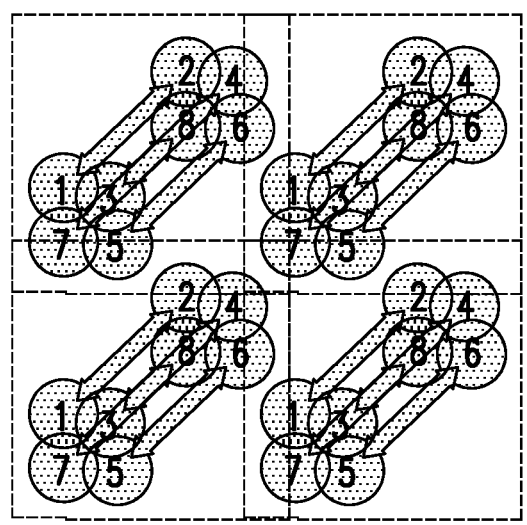
FIG. 11B is a diagram showing layout of a plurality of pixels corresponding to FIG. 11A.

FIG. 9B is a diagram showing layout of a plurality of pixels 891 corresponding to FIG. 9A. FIG. 10B is a diagram showing layout of a plurality of pixels 891 corresponding to FIG. 10A. FIG. 11B is a diagram showing layout of a plurality of pixels 891 corresponding to FIG. 11A. According to FIG. 9B, FIG. 10B, and FIG. 11B, the layout generated by the plurality of pixels 891 as shown in FIG. 10B can have a greater pixel density.

Figure 12A:
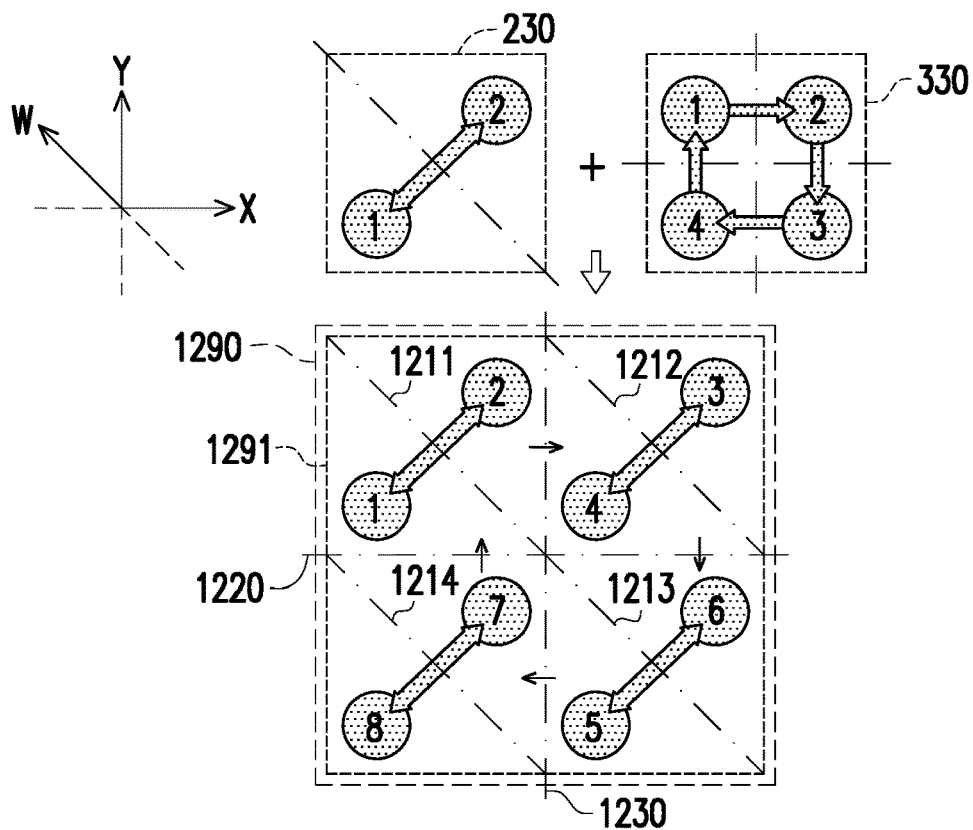
FIG. 12A is a schematic diagram of a pixel corresponding to the actuator of FIG. 4A.
Figure 12B:
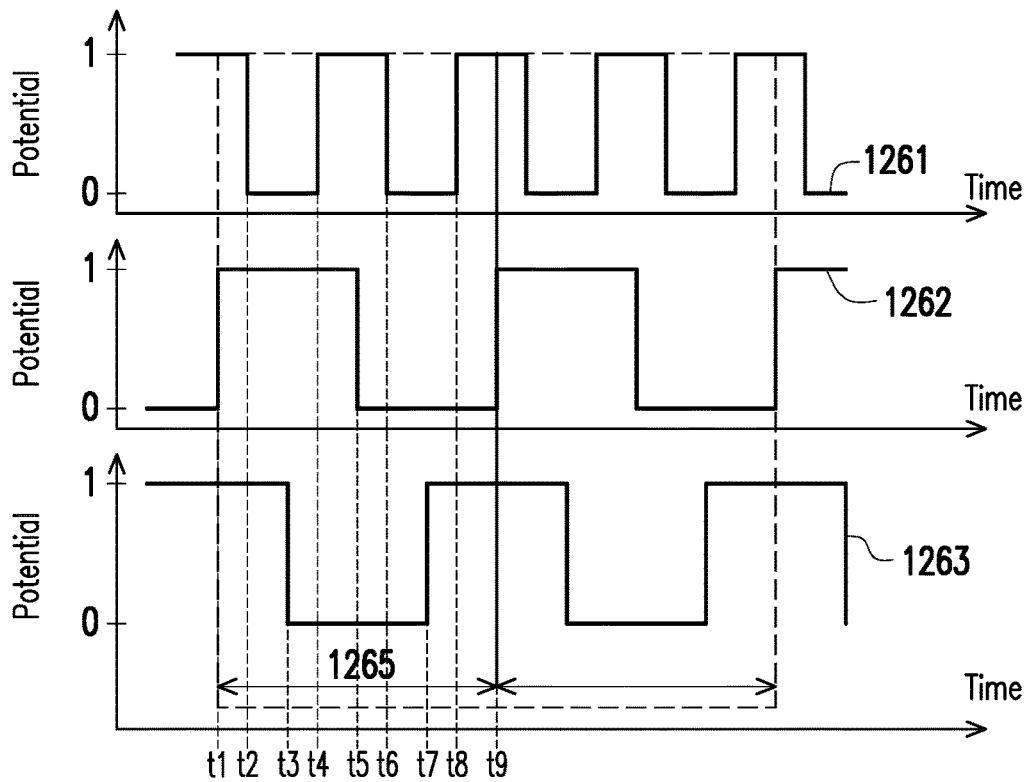
FIG. 12B is a schematic diagram of driving signals corresponding to the actuator of FIG. 4A.

FIG. 12A is a schematic diagram of a pixel 1291 corresponding to the actuator 400 of FIG. 4A. FIG. 12B is a schematic diagram of driving signals 1261, 1262, and 1263 corresponding to the actuator 400 of FIG. 4A. The driving signal 1261 (or the driving signals 1262, 1263) is, for example, an analog signal or a digital signal. With reference to FIG. 1A to FIG. 1D, FIG. 4A, FIG. 12A, and FIG. 12B, in this embodiment, the driving signal 1261 (e.g., a third driving signal) may be configured to control the driving assembly 451 to drive the frame body 421, such that the optical element 431 reciprocally swings based on the actuating axis 41. The driving signal 1262 (e.g., a second driving signal) may be configured to control the driving assembly 452 to drive the moving frame 422, such that the optical element 432 reciprocally swings based on the actuating axis 42. The driving signal 1263 (e.g., a first driving signal) may be configured to control the driving assembly 453 to drive the moving frame 423, such that the optical element 432 reciprocally swings based on the actuating axis 43. The driving signal 1262 and the driving signal 1263 may have a same frequency (e.g., a first frequency), and a phase difference between the driving signal 1262 and the driving signal 1263 may not be zero. For example, the phase difference between the driving signal 1262 and the driving signal 1263 may be 90 degrees. A frequency (e.g., a second frequency) of the driving signal 1261 may be different from the frequency of the driving signal 1262 (or the driving signal 1263). The frequency of the driving signal 1261 may be an integer multiple of the frequency of the driving signal 1262 (or the driving signal 1263). As shown in FIG. 12B, the frequency of the driving signal 1261 may be 2 times the frequency of the driving signal 1262 (or the driving signal 1263).

A time interval 1265 may be one period for generating the pixel 1291. Taking the time interval 1265 as an example, at time point t1, the driving signal 1262 changing from a low potential to a high potential may drive the moving frame 422, such that the optical element 432 swings in the positive direction based on the actuating axis 42 (may be regarded as rotating around the actuating axis 42 in a clockwise direction). When the optical element 432 swings in the positive direction based on the actuating axis 42, the light spot formed by the image light beam on an imaginary plane 1290 may move in the Y-axis direction along the radial direction of an axial line 1220. The axial line 1220 may be a projection of the actuating axis 42 on the imaginary plane 1290, and the axial line 1220 may be parallel to the X-axis direction. The driving signal 1263 maintained at a high potential may not drive the moving frame 423, such that the optical element 432 does not swing based on the actuating axis 43. Accordingly, the light spot formed by the image light beam on the imaginary plane 1290 may not move along the radial direction of an axial line 1230. The axial line 1230 may be a projection of the actuating axis 43 on the imaginary plane 1290, and the axial line 1230 may be parallel to the Y-axis direction. The driving signal 1261 maintained at a high potential may not drive the frame body 421, such that the optical element 431 does not swing based on the actuating axis 41. Accordingly, the light spot formed by the image light beam on the imaginary plane 1290 may not move along the radial direction of an axial line 1211. The axial line 1211 may be an axial line on the imaginary plane 1290 relative to the actuating axis 41 when the optical element 432 swings in the positive direction based on the actuating axis 42 and the positive direction based on the actuating axis 43. Based on the above, at time point t1, the light spot formed by the image light beam on the imaginary plane 1290 may move to and stay at position 1.

During the time interval 1265, at time point t2, the driving signal 1262 is maintained at a high potential, so the driving signal 1262 may not drive the moving frame 422, such that the optical element 432 does not swing around the actuating axis 42. Accordingly, the light spot formed by the image light beam on the imaginary plane 1290 may not move along a radial direction of the axial line 1220. The driving signal 1263 is maintained at a high potential, so the driving signal 1263 may not drive the moving frame 423, such that the optical element 432 does not swing around the actuating axis 43. Accordingly, the light spot formed by the image light beam on the imaginary plane 1290 may not move along a radial direction of the axial line 1230. The driving signal 1261 changing from a high potential to a low potential may drive the frame body 421, such that the optical element 431 swings in the negative direction based on the actuating axis 41 (may be regarded as rotating around the actuating axis 41 in a counterclockwise direction). When the optical element 431 swings in the negative direction based on the actuating axis 41, the light spot formed by the image light beam on the imaginary plane 1290 may move in the X-axis direction and the Y-axis direction along a radial direction of the axial line 1211. Based on the above, at time point t2, the light spot formed by the image light beam on the imaginary plane 1290 may move to and stay at position 2.

At time point t3, the driving signal 1262 is maintained at a high potential, so the driving signal 1262 may not drive the moving frame 422, such that the optical element 432 does not swing around the actuating axis 42. Accordingly, the light spot formed by the image light beam on the imaginary plane 1290 may not move along the radial direction of the axial line 1220. The driving signal 1263 changing from a high potential to a low potential may drive the moving frame 423, such that the optical element 432 swings in the negative direction based on the actuating axis 43 (may be regarded as rotating around the actuating axis 43 in a counterclockwise direction). When the optical element 432 swings in the negative direction based on the actuating axis 43, the light spot formed by the image light beam on the imaginary plane 1290 may move in the X-axis direction along the radial direction of the axial line 1230. The driving signal 1261 is maintained at a low potential, so the driving signal 1261 may not drive the frame body 421, such that the optical element 431 does not swing around the actuating axis 41. Accordingly, the light spot formed by the image light beam on the imaginary plane 1290 may not move along the radial direction of an axial line 1212. The axial line 1212 may be an axial line on the imaginary plane 1290 relative to the actuating axis 41 when the optical element 432 swings in the positive direction based on the actuating axis 42 and the negative direction based on the actuating axis 43. Based on the above, at time point t3, the light spot formed by the image light beam on the imaginary plane 1290 may move to and stay at position 3.

At time point t4, the driving signal 1262 is maintained at a high potential, so the driving signal 1262 may not drive the moving frame 422, such that the optical element 432 does not swing around the actuating axis 42. Accordingly, the light spot formed by the image light beam on the imaginary plane 1290 may not move along the radial direction of the axial line 1220. The driving signal 1263 is maintained at a low potential, so the driving signal 1263 may not drive the moving frame 423, such that the optical element 432 does not swing around the actuating axis 43. Accordingly, the light spot formed by the image light beam on the imaginary plane 1290 may not move along the radial direction of the axial line 1230. The driving signal 1261 changing from a low potential to a high potential may drive the frame body 421, such that the optical element 431 swings in the positive direction based on the actuating axis 41. When the optical element 431 swings in the positive direction based on the actuating axis 41, the light spot formed by the image light beam on the imaginary plane 1290 may move in the negative X-axis direction and the negative Y-axis direction along a radial direction of the axial line 1212. Based on the above, at time point t4, the light spot formed by the image light beam on the imaginary plane 1290 may move to and stay at position 4.

At time point t5, the driving signal 1262 changing from a high potential to a low potential may drive the moving frame 422, such that the optical element 432 swings in the negative direction based on the actuating axis 42. When the optical element 432 swings in the negative direction based on the actuating axis 42, the light spot formed by the image light beam on the imaginary plane 1290 may move in the negative Y-axis direction along the radial direction of the axial line 1220. The driving signal 1263 is maintained at a low potential, so the driving signal 1263 may not drive the moving frame 423, such that the optical element 432 does not swing around the actuating axis 43. Accordingly, the light spot formed by the image light beam on the imaginary plane 1290 may not move along the radial direction of the axial line 1230. The driving signal 1261 is maintained at a high potential, so the driving signal 1261 may not drive the frame body 421, such that the optical element 431 does not swing around the actuating axis 41. Accordingly, the light spot formed by the image light beam on the imaginary plane 1290 may not move along the radial direction of an axial line 1213. The axial line 1213 may be an axial line on the imaginary plane 1290 relative to the actuating axis 41 when the optical element 432 swings in the negative direction based on the actuating axis 42 and the negative direction based on the actuating axis 43. Based on the above, at time point t5, the light spot formed by the image light beam on the imaginary plane 1290 may move to and stay at position 5.

At time point t6, the driving signal 1262 is maintained at a low potential, so the driving signal 1262 may not drive the moving frame 422, such that the optical element 432 does not swing around the actuating axis 42. Accordingly, the light spot formed by the image light beam on the imaginary plane 1290 may not move along the radial direction of the axial line 1220. The driving signal 1263 is maintained at a low potential, so the driving signal 1263 may not drive the moving frame 423, such that the optical element 432 does not swing around the actuating axis 43. Accordingly, the light spot formed by the image light beam on the imaginary plane 1290 may not move along the radial direction of the axial line 1230. The driving signal 1261 changing from a high potential to a low potential may drive the frame body 421, such that the optical element 431 swings in the negative direction based on the actuating axis 41. When the optical element 431 swings in the negative direction based on the actuating axis 41, the light spot formed by the image light beam on the imaginary plane 1290 may move in the X-axis direction and the Y-axis direction along a radial direction of the axial line 1213. Based on the above, at time point t6, the light spot formed by the image light beam on the imaginary plane 1290 may move to and stay at position 6.

At time point t7, the driving signal 1262 is maintained at a low potential, so the driving signal 1262 may not drive the moving frame 422, such that the optical element 432 does not swing around the actuating axis 42. Accordingly, the light spot formed by the image light beam on the imaginary plane 1290 may not move along the radial direction of the axial line 1220. The driving signal 1263 changing from a low potential to a high potential may drive the moving frame 423, such that the optical element 432 swings in the positive direction based on the actuating axis 43. When the optical element 432 swings in the positive direction based on the actuating axis 43, the light spot formed by the image light beam on the imaginary plane 1290 may move in the negative X-axis direction along the radial direction of the axial line 1230. The driving signal 1261 is maintained at a low potential, so the driving signal 1261 may not drive the frame body 421, such that the optical element 431 does not swing around the actuating axis 41. Accordingly, the light spot formed by the image light beam on the imaginary plane 1290 may not move along the radial direction of an axial line 1214. The axial line 1214 may be an axial line on the imaginary plane 1290 relative to the actuating axis 41 when the optical element 432 swings in the negative direction based on the actuating axis 42 and the positive direction based on the actuating axis 43. Based on the above, at time point t7, the light spot formed by the image light beam on the imaginary plane 1290 may move to and stay at position 7.

At time point t8, the driving signal 1262 is maintained at a low potential, so the driving signal 1262 may not drive the moving frame 422, such that the optical element 432 does not swing around the actuating axis 42. Accordingly, the light spot formed by the image light beam on the imaginary plane 1290 may not move along the radial direction of the axial line 1220. The driving signal 1263 is maintained at a high potential, so the driving signal 1263 may not drive the moving frame 423, such that the optical element 432 does not swing around the actuating axis 43. Accordingly, the light spot formed by the image light beam on the imaginary plane 1290 may not move along the radial direction of the axial line 1230. The driving signal 1261 changing from a low potential to a high potential may drive the frame body 421, such that the optical element 431 swings in the positive direction based on the actuating axis 41. When the optical element 431 swings in the positive direction based on the actuating axis 41, the light spot formed by the image light beam on the imaginary plane 1290 may move in the negative X-axis direction and the negative Y-axis direction along a radial direction of the axial line 1214. Based on the above, at time point t8, the light spot formed by the image light beam on the imaginary plane 1290 may move to and stay at position 8.

At time point t9, the driving signal 1262 changing from a low potential to a high potential may drive the moving frame 422, such that the optical element 432 swings in the positive direction based on the actuating axis 42. When the optical element 432 swings in the positive direction based on the actuating axis 42, the light spot formed by the image light beam on the imaginary plane 1290 may move in the Y-axis direction along the radial direction of the axial line 1220. The driving signal 1263 is maintained at a high potential, so the driving signal 1263 may not drive the moving frame 423, such that the optical element 432 does not swing around the actuating axis 43. Accordingly, the light spot formed by the image light beam on the imaginary plane 1290 may not move along the radial direction of the axial line 1230. The driving signal 1261 is maintained at a high potential, so the driving signal 1261 may not drive the frame body 421, such that the optical element 431 does not swing around the actuating axis 41. Accordingly, the light spot formed by the image light beam on the imaginary plane 1290 may not move along the radial direction of the axial line 1211. Based on the above, at time point t9, the light spot formed by the image light beam on the imaginary plane 1290 may return to position 1.

Figure 13A:
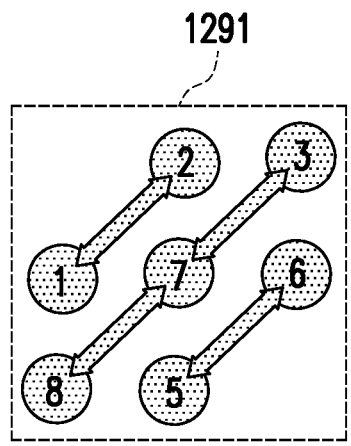
FIG. 13A is a schematic diagram showing a pixel according to an embodiment of the disclosure.

The controller 40 (shown in FIG. 1A to FIG. 1D) may adjust the swing angle of the frame body 421 or the swing angle of the frame body 420 during swinging by at least one driving assembly, thereby changing the appearance of the pixel 1291. FIG. 13A is a schematic diagram showing a pixel 1291 according to an embodiment of the disclosure. The light spot formed by the image light beam on the imaginary plane 1290 may move in a sequence from position 1 to position 8, thereby forming the pixel 1291. On the basis of the pixel of FIG. 13A (reference may be made to FIG. 4A and FIG. 12A for other reference numerals), in this embodiment, the swing angle corresponding to the actuating axis 41 may be $\sqrt{2}$ times the swing angle corresponding to the actuating axis 42, and the swing angle corresponding to the actuating axis 42 may be the same as the swing angle corresponding to the actuating axis 43. Therefore, when an image light beam passes through the optical element 431 and the optical element 432 reciprocally swinging and is transmitted to the imaginary plane 1290 to form a light spot moving on the imaginary plane 1290, a displacement (e.g., a third displacement) of the light spot in the radial direction (e.g., a third radial direction) of the axial line 1211 (or the axial line 1212, the axial line 1213, the axial line 1214) corresponding to the actuating axis 41 (e.g., the third actuating axis) may be $\sqrt{2}$ times a displacement (e.g., a second displacement) of the light spot in the radial direction (e.g., a second radial direction) of the axial line 1220 corresponding to the actuating axis 42 (e.g., the second actuating axis). In addition, the displacement (e.g., the third displacement) of the light spot in the radial direction (e.g., the third radial direction) of the axial line 1211 (or the axial line 1212, the axial line 1213, and the axial line 1214) corresponding to the actuating axis 41 (e.g., the third actuating axis) may be $\sqrt{2}$ times a displacement (e.g., a first displacement) of the light spot in the radial direction (e.g., a first radial direction) of the axial line 1230 corresponding to the actuating axis 43 (e.g., the first actuating axis).

Figure 14A:
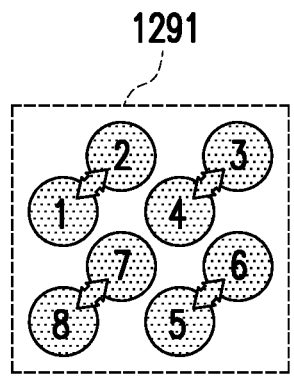
FIG. 14A is a schematic diagram showing a pixel according to still another embodiment of the disclosure.

FIG. 14A is a schematic diagram showing a pixel 1291 according to still another embodiment of the disclosure. The light spot formed by the image light beam on the imaginary plane 1290 may move in a sequence from position 1 to position 8, thereby forming the pixel 1291. On the basis of the pixel of FIG. 14A (reference may be made to FIG. 4A and FIG. 12A for other reference numerals), in this embodiment, the swing angle corresponding to the actuating axis 41 may be $\sqrt{2}/2$ times the swing angle corresponding to the actuating axis 42, and the swing angle corresponding to the actuating axis 42 may be the same as the swing angle corresponding to the actuating axis 43. Therefore, when an image light beam passes through the optical element 431 and the optical element 432 reciprocally swinging and is transmitted to the imaginary plane 1290 to form a light spot moving on the imaginary plane 1290, a displacement (e.g., a third displacement) of the light spot in the radial direction (e.g., the third radial direction) of the axial line 1211 (or the axial line 1212, the axial line 1213, the axial line 1214) corresponding to the actuating axis 41 (e.g., the third actuating axis) may be $\sqrt{2}/2$ times a displacement (e.g., a second displacement) of the light spot in the radial direction (e.g., the second radial direction) of the axial line 1220 corresponding to the actuating axis 42 (e.g., the second actuating axis). In addition, the displacement (e.g., the third displacement) of the light spot in the radial direction (e.g., the third radial direction) of the axial line 1211 (or the axial line 1212, the axial line 1213, and the axial line 1214) corresponding to the actuating axis 41 (e.g., the third actuating axis) may be $\sqrt{2}/2$ times a displacement (e.g., a first displacement) of the light spot in the radial direction (e.g., the first radial direction) of the axial line 1230 corresponding to the actuating axis 43 (e.g., the first actuating axis).

Figure 15A:
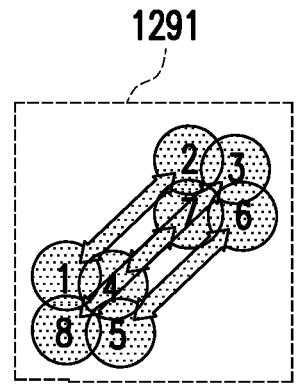
FIG. 15A is a schematic diagram showing a pixel according to yet another embodiment of the disclosure.

FIG. 15A is a schematic diagram showing a pixel 1291 according to yet another embodiment of the disclosure. The light spot formed by the image light beam on the imaginary plane 1290 may move in a sequence from position 1 to position 8, thereby forming the pixel 1291. On the basis of the pixel of FIG. 15A (reference may be made to FIG. 4A and FIG. 12A for other reference numerals), in this embodiment, the swing angle corresponding to the actuating axis 41 may be $2\sqrt{2}$ times the swing angle corresponding to the actuating axis 42, and the swing angle corresponding to the actuating axis 42 may be the same as the swing angle corresponding to the actuating axis 43. Therefore, when an image light beam passes through the optical element 431 and the optical element 432 reciprocally swinging and is transmitted to the imaginary plane 1290 to form a light spot moving on the imaginary plane 1290, a displacement (e.g., a third displacement) of the light spot in the radial direction (e.g., the third radial direction) of the axial line 1211 (or the axial line 1212, the axial line 1213, the axial line 1214) corresponding to the actuating axis 41 (e.g., the third actuating axis) may be $2\sqrt{2}$ times a displacement (e.g., a second displacement) of the light spot in the radial direction (e.g., the second radial direction) of the axial line 1220 corresponding to the actuating axis 42 (e.g., the second actuating axis). In addition, the displacement (e.g., the third displacement) of the light spot in the radial direction (e.g., the third radial direction) of the axial line 1211 (or the axial line 1212, the axial line 1213, and the axial line 1214) corresponding to the actuating axis 41 (e.g., the third actuating axis) may be $2\sqrt{2}$ times a displacement (e.g., a first displacement) of the light spot in the radial direction (e.g., the first radial direction) of the axial line 1230 corresponding to the actuating axis 43 (e.g., the first actuating axis).

Figure 13B:
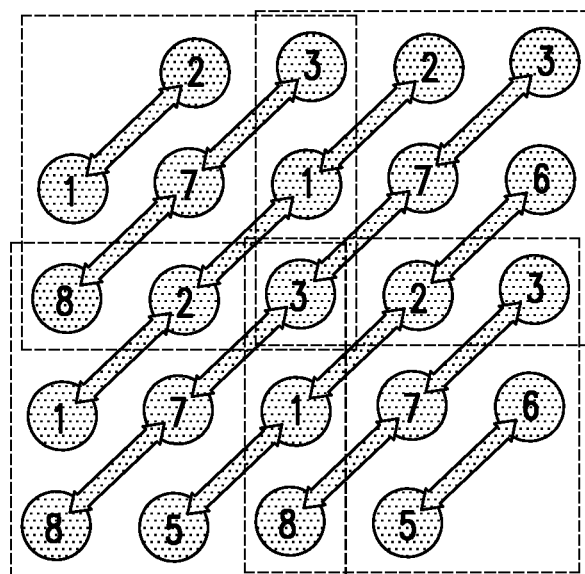
FIG. 13B is a diagram showing layout of a plurality of pixels corresponding to FIG. 13A.
Figure 14B:
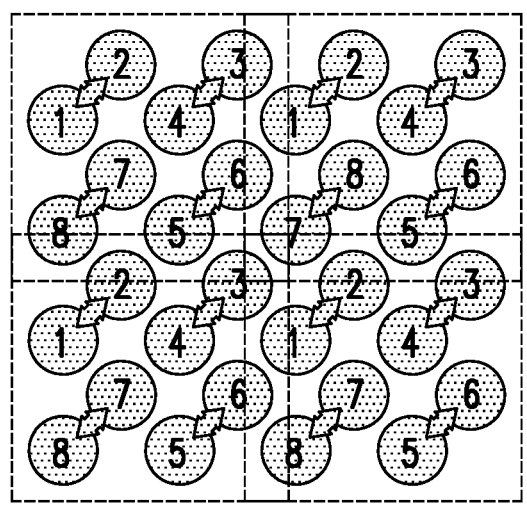
FIG. 14B is a diagram showing layout of a plurality of pixels corresponding to FIG. 14A.
Figure 15B:
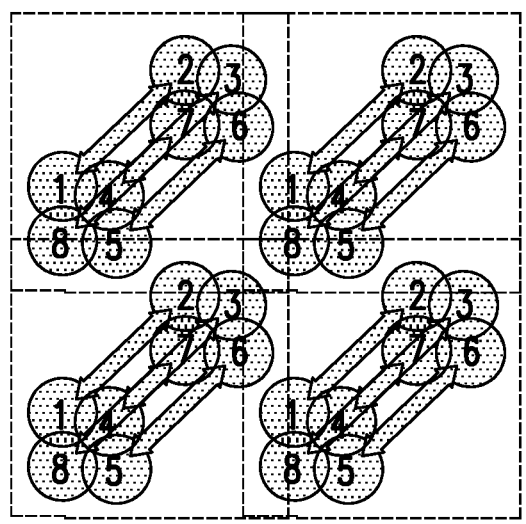
FIG. 15B is a diagram showing layout of a plurality of pixels corresponding to FIG. 15A.

FIG. 13B is a diagram showing layout of a plurality of pixels 1291 corresponding to FIG. 13A. FIG. 14B is a diagram showing layout of a plurality of pixels 1291 corresponding to FIG. 14A. FIG. 15B is a diagram showing layout of a plurality of pixels 1291 corresponding to FIG. 15A. According to FIG. 13B, FIG. 14B, and FIG. 15B, the layout generated by the plurality of pixels 1291 as shown in FIG. 14B can have a greater pixel density.

According to the embodiments of the disclosure shown in FIG. 4A to FIG. 15B, in the actuator 400 having three axes, by various ways of driving described above, the light spot formed by the image light beam on the imaginary planes 490, 890, and 1290 may move between 8 positions to respectively form the pixels 491, 891, and 1291. Compared with the comparative example of FIG. 2A, FIG. 2B, and FIG. 2C and the comparative example of FIG. 3A, FIG. 3B, and FIG. 3C, the resolution of the image light beam can be further increased.

Figure 16A:
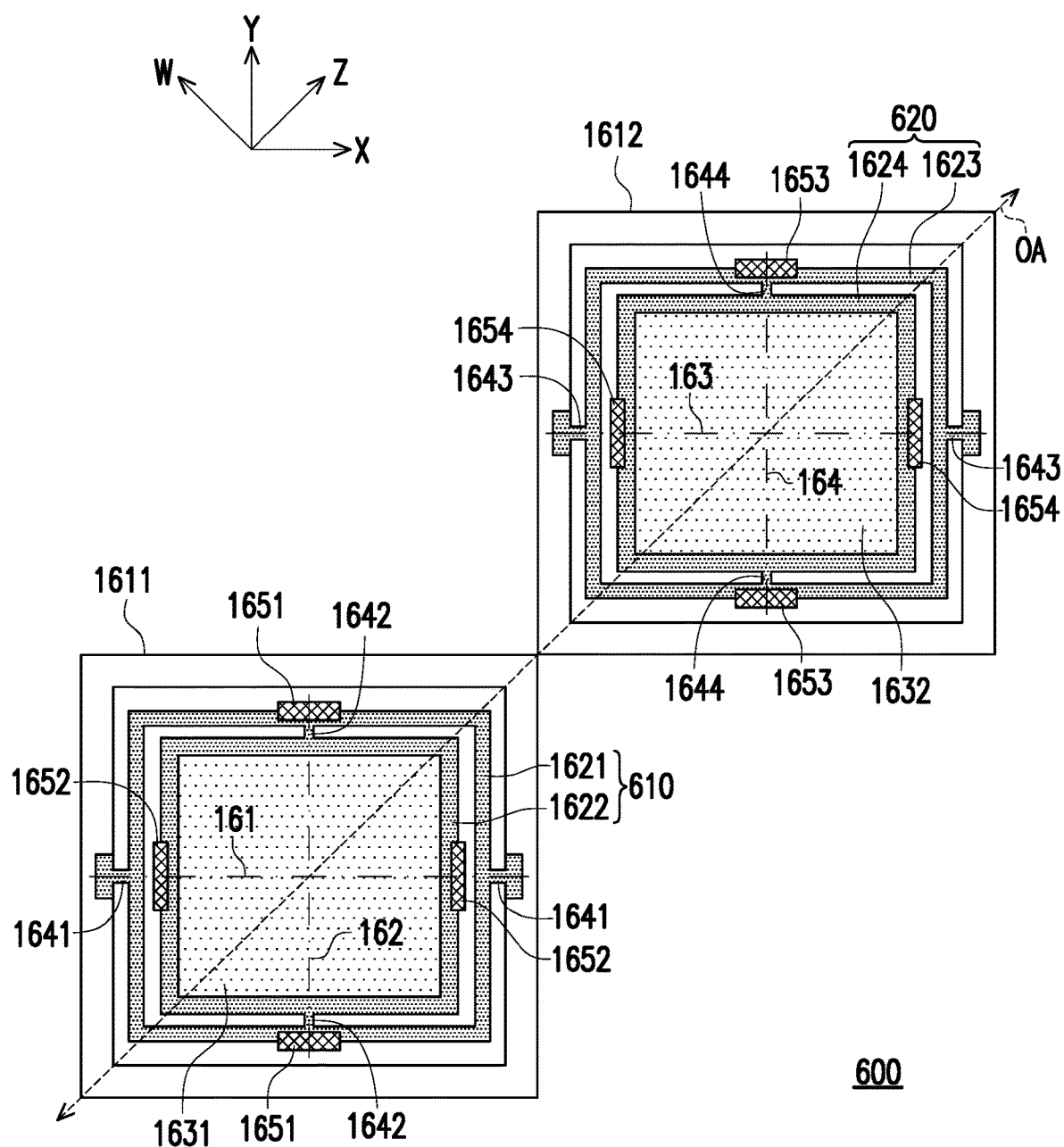
FIG. 16A is a perspective view showing an actuator having four axes according to an embodiment of the disclosure.
Figure 16B:
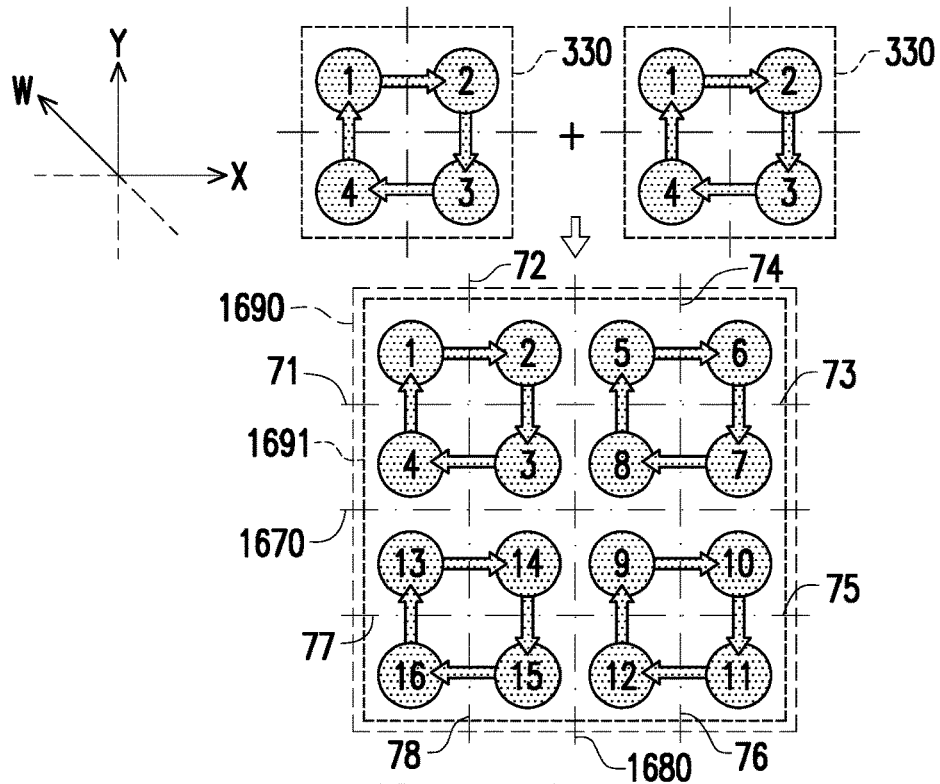
FIG. 16B is a schematic diagram of a pixel corresponding to the actuator of FIG. 16A.
Figure 16C:
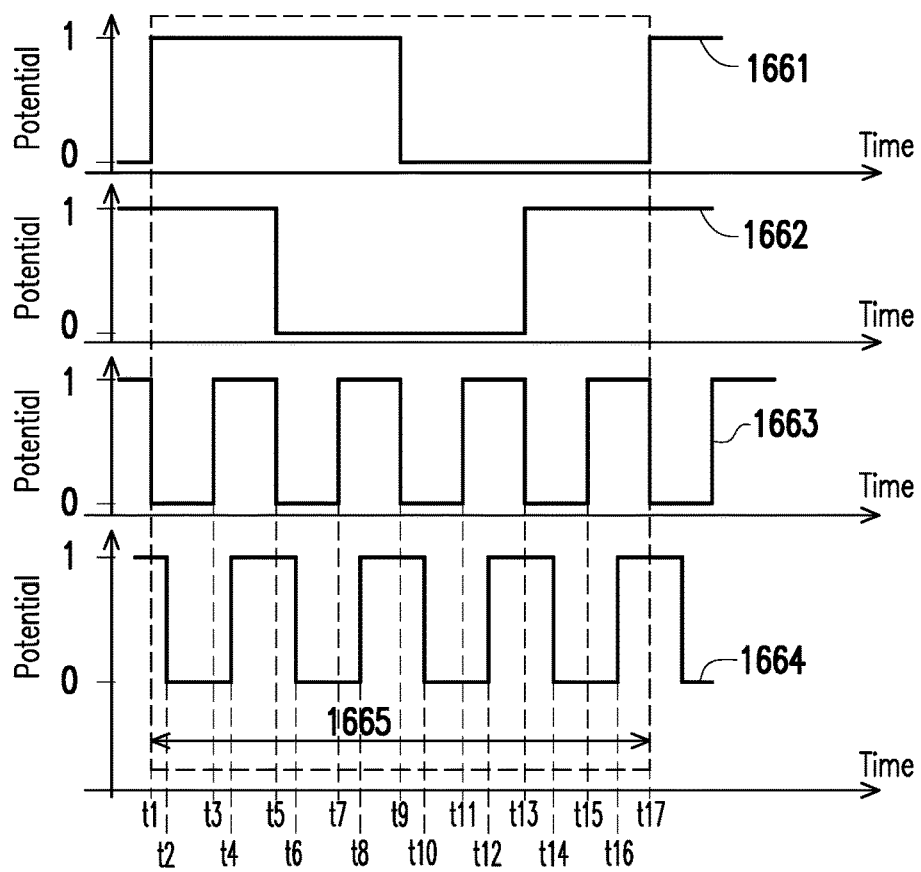
FIG. 16C is a schematic diagram of driving signals corresponding to the actuator of FIG. 16A.

With reference back to FIG. 1A to FIG. 1D, the actuator 150 in FIG. 1A to FIG. 1D is, for example, an actuator 600 having four axes in FIG. 16A. In other words, the actuator 600 of FIG. 16A may be applied to any one of the projection device 100A of FIG. 1A to the projection device 100D of FIG. 1D. Alternatively, part of the actuator 600 of FIG. 16A may also be disposed in the projection lens 140 of FIG. 1A, FIG. 1C, or FIG. 1D. The frame body 151 of the actuator 150 is, for example, a frame body 620 (e.g., a first frame body) of the actuator 600, and the frame body 152 of the actuator 150 is, for example, a frame body 610 (e.g., a second frame body) of the actuator 600. FIG. 16A is a perspective view showing the actuator 600 having four axes according to an embodiment of the disclosure. FIG. 16B is a schematic diagram of a pixel 1691 corresponding to the actuator 600 of FIG. 16A. FIG. 16C is a schematic diagram of driving signals 1661, 1662, 1663, and 1664 corresponding to the actuator 600 of FIG. 16A. The driving signal 1661 (or the driving signals 1662, 1663, 1664) is, for example, an analog signal or a digital signal. Reference may be to FIG. 1A to FIG. 1D, FIG. 16A, FIG. 16B, and FIG. 16C.

The actuator 600 may include a base 1611 (e.g., a second base), a base 1612 (e.g., a first base), and a controller 160 (shown in FIG. 1A to FIG. 1D). The actuator 600 may also include the frame body 610 (e.g., the second frame body) and an optical element 1631 (e.g., a second optical element) corresponding to the base 1611. The frame body 610 may be disposed in the base 1611, and the optical element 1631 may be disposed in the frame body 610. The frame body 610 may be connected to the base 1611 through a rotating shaft 1641. The frame body 610 may include a moving frame 1621 (e.g., a fourth moving frame) and a moving frame 1622 (e.g., a third moving frame). The moving frame 1621 may be disposed in the base 1611, and may be connected to the base 1611 through the rotating shaft 1641. The moving frame 1622 may be disposed in the moving frame 1621, and may be connected to the moving frame 1621 through a rotating shaft 1642. The optical element 1631 may be disposed in the moving frame 1622. On the other hand, the actuator 600 may also include the frame body 620 (e.g., the first frame body) and an optical element 1632 (e.g., a first optical element) corresponding to the base 1612. The frame body 620 may be disposed in the base 1612, and the optical element 1632 may be disposed in the frame body 620. The frame body 620 may be connected to the base 1612 through a rotating shaft 1643. The frame body 620 may include a moving frame 1623 (e.g., a second moving frame) and a moving frame 1624 (e.g., a first moving frame). The moving frame 1623 may be disposed in the base 1612, and may be connected to the base 1612 through the rotating shaft 1643. The moving frame 1624 may be disposed in the moving frame 1623, and may be connected to the moving frame 1623 through a rotating shaft 1644. The optical element 1632 may be disposed in the moving frame 1624. The optical element 1631 and the optical element 1632 may be disposed on the optical axis OA of the image light beam. In an embodiment, the optical element 1631 (or the optical element 1632) may be configured such that the normal of the center point of the optical element 1631 (or the optical element 1632) coincides with the optical axis OA of the image light beam. In other words, the frame body 610 and the frame body 620 may be overlapped along the direction of the optical axis OA of the image light beam, such that the optical element 1631 and the optical element 1632 may be overlapped along the direction of the optical axis OA of the image light beam.

The actuator 600 may also include at least one driving assembly disposed between the base 1611 and the frame body 610. The at least one driving assembly is, for example, a voice coil motor or a piezoelectric material. The controller 160 (shown in FIG. 1A to FIG. 1D) may be coupled to the at least one driving assembly, and may be configured to control the at least one driving assembly to drive the frame body 610 by a signal (e.g., a second signal), such that the optical element 1631 reciprocally swings relative to the base 1611 based on an actuating axis 161 (e.g., a fourth actuating axis) and an actuating axis 162 (e.g., a third actuating axis). The signal includes the driving signal 1661 and the driving signal 1662 (e.g., a fourth driving signal and a third driving signal). On the other hand, the actuator 600 may also include at least one driving assembly disposed between the base 1612 and the frame body 620. The at least one driving assembly is, for example, a voice coil motor or a piezoelectric material. The controller 160 may be coupled to the at least one driving assembly, and may be configured to control the at least one driving assembly to drive the frame body 620 by a signal (e.g., a first signal), such that the optical element 1632 reciprocally swings relative to the base 1612 based on an actuating axis 163 (e.g., a second actuating axis) and an actuating axis 164 (e.g., a first actuating axis). The signal includes the driving signal 1663 and the driving signal 1664 (e.g., a second driving signal and a first driving signal). In this embodiment, assuming that the optical axis OA of the image light beam is parallel to the Z-axis direction, then the actuating axis 161 or the actuating axis 163 may be parallel to the X-axis direction, and the actuating axis 162 or the actuating axis 164 may be parallel to the Y-axis direction. In other words, the actuating axis 161 (or the actuating axis 163) may be perpendicular to the actuating axis 162 (or the actuating axis 164). The actuating axis 161 may coincide with the actuating axis 163. The actuating axis 162 may coincide with the actuating axis 164.

Specifically, the at least one driving assembly between the base 1611 and the frame body 610 may include a driving assembly 1651 (e.g., a fourth driving assembly) disposed between the base 1611 and the moving frame 1621. The controller 160 may control the driving assembly 1651 to drive the moving frame 1621 by the driving signal 1661 (e.g., the fourth driving signal), such that the optical element 1631 reciprocally swings relative to the base 1611 based on the actuating axis 161. The number of driving assemblies 1651 may be 1, 2, or N (where N is any positive integer). When the number of driving assemblies 1651 is two, the two driving assemblies 1651 may be respectively disposed on opposite sides of the moving frame 1621. In addition, the at least one driving assembly between the base 1611 and the frame body 610 may also include a driving assembly 1652 (e.g., a third driving assembly) disposed between the moving frame 1621 and the moving frame 1622. The controller 160 may control the driving assembly 1652 to drive the moving frame 1622 by the driving signal 1662 (e.g., the third driving signal), such that the optical element 1631 reciprocally swings relative to the base 1611 based on the actuating axis 162. The number of driving assemblies 1652 may be 1, 2, or N (where N is any positive integer). When the number of driving assemblies 1652 is two, the two driving assemblies 1652 may be respectively disposed on opposite sides of the moving frame 1622. When the optical element 1631 reciprocally swings based on the actuating axis 161 and the actuating axis 162, the image light beam passing through the optical element 1631 may be transmitted to an imaginary plane 1690 to form a light spot moving on the imaginary plane 1690, and the movement trajectory of the light spot is similar to the movement trajectory of the light spot in the imaginary plane 330 of FIG. 3B. In an embodiment, the driving assembly 1651 may be disposed on the actuating axis 162. The driving assembly 1652 may be disposed on the actuating axis 161.

On the other hand, the at least one driving assembly between the base 1612 and the frame body 620 may include a driving assembly 1653 (e.g., a second driving assembly) disposed between the base 1612 and the moving frame 1623. The controller 160 may control the driving assembly 1653 to drive the moving frame 1623 by the driving signal 1663 (e.g., the second driving signal), such that the optical element 1632 reciprocally swings relative to the base 1612 based on the actuating axis 163. The number of driving assemblies 1653 may be 1, 2, or N (where N is any positive integer). When the number of driving assemblies 1653 is two, the two driving assemblies 1653 may be respectively disposed on opposite sides of the moving frame 1623. In addition, the at least one driving assembly between the base 1612 and the frame body 620 may also include a driving assembly 1654 (e.g., a first driving assembly) disposed between the moving frame 1623 and the moving frame 1624. The controller 160 may control the driving assembly 1654 to drive the moving frame 1624 by the driving signal 1664 (e.g., the first driving signal), such that the optical element 1632 reciprocally swings relative to the base 1612 based on the actuating axis 164. The number of driving assemblies 1654 may be 1, 2, or N (where N is any positive integer). When the number of driving assemblies 1654 is two, the two driving assemblies 1654 may be respectively disposed on opposite sides of the moving frame 1624. When the optical element 1632 reciprocally swings based on the actuating axis 163 and the actuating axis 164, the image light beam passing through the optical element 1632 may be transmitted to the imaginary plane 1690 to form a light spot moving on the imaginary plane 1690, and the movement trajectory of the light spot is similar to the movement trajectory of the light spot in the imaginary plane 330 of FIG. 3B. In an embodiment, the driving assembly 1653 may be disposed on the actuating axis 164. The driving assembly 1654 may be disposed on the actuating axis 163.

The image light beam may be transmitted to the imaginary plane 1690 by the optical element 1631 and the optical element 1632 and form a light spot on the imaginary plane 1690. When the optical element 1631 reciprocally swings based on the actuating axis 161 and the actuating axis 162 and the optical element 1632 reciprocally swings based on the actuating axis 163 and the actuating axis 164, the movement trajectory of the light spot in the imaginary plane 1690 is similar to an overlap of two movement trajectories same as the movement trajectory of the light spot in the imaginary plane 330. The image light beam passing through the optical element 1631 and the optical element 1632 may form a light spot on the imaginary plane 1690 moving in a sequence from position 1 to position 16. Accordingly, the moving light spot forms the pixel 1691.

The driving signal 1661 and the driving signal 1662 may have a same frequency (e.g., a second frequency), and a phase difference between the driving signal 1661 and the driving signal 1662 may not be zero. For example, the phase difference between the driving signal 1661 and the driving signal 1662 may be 90 degrees. The driving signal 1663 and the driving signal 1664 may have a same frequency (e.g., a first frequency), and a phase difference between the driving signal 1663 and the driving signal 1664 may not be zero. For example, the phase difference between the driving signal 1663 and the driving signal 1664 may be 90 degrees. The frequency (e.g., the second frequency) of the driving signal 1661 (or the driving signal 1662) may be different from the frequency (e.g., the first frequency) of the driving signal 1663 (or the driving signal 1664). In an embodiment, the frequency of the driving signal 1661 (or the driving signal 1662) may be an integer multiple of the frequency of the driving signal 1663 (or the driving signal 1664). For example, the frequency of the driving signal 1661 (or the driving signal 1662) may be 4 times the frequency of the driving signal 1663 (or the driving signal 1664). In another embodiment, the frequency of the driving signal 1663 (or the driving signal 1664) may be an integer multiple of the frequency of the driving signal 1661 (or the driving signal 1662). For example, the frequency of the driving signal 1663 (or the driving signal 1664) may be 4 times the frequency of the driving signal 1661 (or the driving signal 1662), as shown in FIG. 16C.

A time interval 1665 may be one period for generating the pixel 1691. Taking the time interval 1665 as an example, at time point t1, the driving signal 1661 changing from a low potential to a high potential may drive the moving frame 1621, such that the optical element 1631 swings in a positive direction based on the actuating axis 161 (may be regarded as rotating around the actuating axis 161 along a clockwise direction). When the optical element 1631 swings in the positive direction based on the actuating axis 161, the light spot formed by the image light beam on the imaginary plane 1690 may move in the Y-axis direction along a radial direction of an axial line 1670. The axial line 1670 may be a projection of the actuating axis 161 on the imaginary plane 1690, and the axial line 1670 may be parallel to the X-axis direction. The driving signal 1662 maintained at a high potential may not drive the moving frame 1622, such that the optical element 1631 does not swing based on the actuating axis 162. Accordingly, the light spot formed by the image light beam on the imaginary plane 1690 may not move along a radial direction of an axial line 1680. The axial line 1680 may be a projection of the actuating axis 162 on the imaginary plane 1690, and the axial line 1680 may be parallel to the Y-axis direction. The driving signal 1663 changing from a high potential to a low potential may drive the moving frame 1623, such that the optical element 1632 swings in the negative direction based on the actuating axis 163 (may be regarded as rotating around the actuating axis 163 along a counterclockwise direction). When the optical element 1632 swings in the negative direction based on the actuating axis 163, the light spot formed by the image light beam on the imaginary plane 1690 may move in the Y-axis direction along a radial direction of an axial line 71. The axial line 71 may be an axial line on the imaginary plane 1690 relative to the actuating axis 163 when the optical element 1631 swings in the positive direction based on the actuating axis 161 and the positive direction based on the actuating axis 162. The axial line 71 may be parallel to the X-axis direction. The driving signal 1664 maintained at a high potential may not drive the moving frame 1624, such that the optical element 1632 does not swing based on the actuating axis 164. Accordingly, the light spot formed by the image light beam on the imaginary plane 1690 may not move along a radial direction of an axial line 72. The axial line 72 may be an axial line on the imaginary plane 1690 relative to the actuating axis 164 when the optical element 1631 swings in the positive direction based on the actuating axis 161 and the positive direction based on the actuating axis 162. The axial line 72 may be parallel to the Y-axis direction. Based on the above, at time point t1, the light spot formed by the image light beam on the imaginary plane 1690 may move to and stay at position 1.

At time point t2, the driving signal 1661 is maintained at a high potential, so the driving signal 1661 may not drive the moving frame 1621, such that the optical element 1631 does not swing around the actuating axis 161. Accordingly, the light spot formed by the image light beam on the imaginary plane 1690 may not move along a radial direction of the axial line 1670. The driving signal 1662 is maintained at a high potential, so the driving signal 1662 may not drive the moving frame 1622, such that the optical element 1631 does not swing around the actuating axis 162. Accordingly, the light spot formed by the image light beam on the imaginary plane 1690 may not move along a radial direction of the axial line 1680. The driving signal 1663 is maintained at a low potential, so the driving signal 1663 may not drive the moving frame 1623, such that the optical element 1632 does not swing around the actuating axis 163. Accordingly, the light spot formed by the image light beam on the imaginary plane 1690 may not move along a radial direction of the axial line 71. The driving signal 1664 changing from a high potential to a low potential may drive the moving frame 1624, such that the optical element 1632 swings in the negative direction based on the actuating axis 164 (may be regarded as rotating around the actuating axis 164 along a counterclockwise direction). When the optical element 1632 swings in the negative direction based on the actuating axis 164, the light spot formed by the image light beam on the imaginary plane 1690 may move in the X-axis direction along a radial direction of the axial line 72. Based on the above, at time point t2, the light spot formed by the image light beam on the imaginary plane 1690 may move to and stay at position 2.

At time point t3, the driving signal 1661 is maintained at a high potential, so the driving signal 1661 may not drive the moving frame 1621, such that the optical element 1631 does not swing around the actuating axis 161. Accordingly, the light spot formed by the image light beam on the imaginary plane 1690 may not move along the radial direction of the axial line 1670. The driving signal 1662 is maintained at a high potential, so the driving signal 1662 may not drive the moving frame 1622, such that the optical element 1631 does not swing around the actuating axis 162. Accordingly, the light spot formed by the image light beam on the imaginary plane 1690 may not move along the radial direction of the axial line 1680. The driving signal 1663 changing from a low potential to a high potential may drive the moving frame 1623, such that the optical element 1632 swings in a positive direction based on the actuating axis 163. When the optical element 1632 swings in the positive direction based on the actuating axis 163, the light spot formed by the image light beam on the imaginary plane 1690 may move in the negative Y-axis direction along the radial direction of the axial line 71. The driving signal 1664 is maintained at a low potential, so the driving signal 1664 may not drive the moving frame 1624, such that the optical element 1632 does not swing around the actuating axis 164. Accordingly, the light spot formed by the image light beam on the imaginary plane 1690 may not move along the radial direction of the axial line 72. Based on the above, at time point t3, the light spot formed by the image light beam on the imaginary plane 1690 may move to and stay at position 3.

At time point t4, the driving signal 1661 is maintained at a high potential, so the driving signal 1661 may not drive the moving frame 1621, such that the optical element 1631 does not swing around the actuating axis 161. Accordingly, the light spot formed by the image light beam on the imaginary plane 1690 may not move along the radial direction of the axial line 1670. The driving signal 1662 is maintained at a high potential, so the driving signal 1662 may not drive the moving frame 1622, such that the optical element 1631 does not swing around the actuating axis 162. Accordingly, the light spot formed by the image light beam on the imaginary plane 1690 may not move along the radial direction of the axial line 1680. The driving signal 1663 is maintained at a high potential, so the driving signal 1663 may not drive the moving frame 1623, such that the optical element 1632 does not swing around the actuating axis 163. Accordingly, the light spot formed by the image light beam on the imaginary plane 1690 may not move along the radial direction of the axial line 71. The driving signal 1664 changing from a low potential to a high potential may drive the moving frame 1624, such that the optical element 1632 swings in a positive direction based on the actuating axis 164. When the optical element 1632 swings in the positive direction based on the actuating axis 164, the light spot formed by the image light beam on the imaginary plane 1690 may move in the negative X-axis direction along the radial direction of the axial line 72. Based on the above, at time point t4, the light spot formed by the image light beam on the imaginary plane 1690 may move to and stay at position 4.

At time point t5, the driving signal 1661 is maintained at a high potential, so the driving signal 1661 may not drive the moving frame 1621, such that the optical element 1631 does not swing around the actuating axis 161. Accordingly, the light spot formed by the image light beam on the imaginary plane 1690 may not move along the radial direction of the axial line 1670. The driving signal 1662 changing from a high potential to a low potential may drive the moving frame 1622, such that the optical element 1631 swings in the negative direction based on the actuating axis 162 (may be regarded as rotating around the actuating axis 162 along a counterclockwise direction). When the optical element 1631 swings in the negative direction based on the actuating axis 162, the light spot formed by the image light beam on the imaginary plane 1690 may move in the X-axis direction along the radial direction of the axial line 1680. The driving signal 1663 changing from a high potential to a low potential may drive the moving frame 1623, such that the optical element 1632 swings in the negative direction based on the actuating axis 163. When the optical element 1632 swings in the negative direction based on the actuating axis 163, the light spot formed by the image light beam on the imaginary plane 1690 may move in the Y-axis direction along a radial direction of an axial line 73. The axial line 73 may be an axial line on the imaginary plane 1690 relative to the actuating axis 163 when the optical element 1631 swings in the positive direction based on the actuating axis 161 and the negative direction of the actuating axis 162. The axial line 73 may be parallel to the X-axis direction. The driving signal 1664 is maintained at a high potential, so the driving signal 1664 may not drive the moving frame 1624, such that the optical element 1632 does not swing around the actuating axis 164. Accordingly, the light spot formed by the image light beam on the imaginary plane 1690 may not move along a radial direction of an axial line 74. The axial line 74 may be an axial line on the imaginary plane 1690 relative to the actuating axis 164 when the optical element 1631 swings in the positive direction based on the actuating axis 161 and the negative direction of the actuating axis 162. The axial line 74 may be parallel to the Y-axis direction. Based on the above, at time point t5, the light spot formed by the image light beam on the imaginary plane 1690 may move to and stay at position 5.

At time point t6, the driving signal 1661 is maintained at a high potential, so the driving signal 1661 may not drive the moving frame 1621, such that the optical element 1631 does not swing around the actuating axis 161. Accordingly, the light spot formed by the image light beam on the imaginary plane 1690 may not move along the radial direction of the axial line 1670. The driving signal 1662 is maintained at a low potential, so the driving signal 1662 may not drive the moving frame 1622, such that the optical element 1631 does not swing around the actuating axis 162. Accordingly, the light spot formed by the image light beam on the imaginary plane 1690 may not move along the radial direction of the axial line 1680. The driving signal 1663 is maintained at a low potential, so the driving signal 1663 may not drive the moving frame 1623, such that the optical element 1632 does not swing around the actuating axis 163. Accordingly, the light spot formed by the image light beam on the imaginary plane 1690 may not move along a radial direction of the axial line 73. The driving signal 1664 changing from a high potential to a low potential may drive the moving frame 1624, such that the optical element 1632 swings in the negative direction based on the actuating axis 164. When the optical element 1632 swings in the negative direction based on the actuating axis 164, the light spot formed by the image light beam on the imaginary plane 1690 may move in the X-axis direction along a radial direction of the axial line 74. Based on the above, at time point t6, the light spot formed by the image light beam on the imaginary plane 1690 may move to and stay at position 6.

At time point t7, the driving signal 1661 is maintained at a high potential, so the driving signal 1661 may not drive the moving frame 1621, such that the optical element 1631 does not swing around the actuating axis 161. Accordingly, the light spot formed by the image light beam on the imaginary plane 1690 may not move along the radial direction of the axial line 1670. The driving signal 1662 is maintained at a low potential, so the driving signal 1662 may not drive the moving frame 1622, such that the optical element 1631 does not swing around the actuating axis 162. Accordingly, the light spot formed by the image light beam on the imaginary plane 1690 may not move along the radial direction of the axial line 1680. The driving signal 1663 changing from a low potential to a high potential may drive the moving frame 1623, such that the optical element 1632 swings in the positive direction based on the actuating axis 163. When the optical element 1632 swings in the positive direction based on the actuating axis 163, the light spot formed by the image light beam on the imaginary plane 1690 may move in the negative Y-axis direction along the radial direction of the axial line 73. The driving signal 1664 is maintained at a low potential, so the driving signal 1664 may not drive the moving frame 1624, such that the optical element 1632 does not swing around the actuating axis 164. Accordingly, the light spot formed by the image light beam on the imaginary plane 1690 may not move along the radial direction of the axial line 74. Based on the above, at time point t7, the light spot formed by the image light beam on the imaginary plane 1690 may move to and stay at position 7.

At time point t8, the driving signal 1661 is maintained at a high potential, so the driving signal 1661 may not drive the moving frame 1621, such that the optical element 1631 does not swing around the actuating axis 161. Accordingly, the light spot formed by the image light beam on the imaginary plane 1690 may not move along the radial direction of the axial line 1670. The driving signal 1662 is maintained at a low potential, so the driving signal 1662 may not drive the moving frame 1622, such that the optical element 1631 does not swing around the actuating axis 162. Accordingly, the light spot formed by the image light beam on the imaginary plane 1690 may not move along the radial direction of the axial line 1680. The driving signal 1663 is maintained at a high potential, so the driving signal 1663 may not drive the moving frame 1623, such that the optical element 1632 does not swing around the actuating axis 163. Accordingly, the light spot formed by the image light beam on the imaginary plane 1690 may not move along the radial direction of the axial line 73. The driving signal 1664 changing from a low potential to a high potential may drive the moving frame 1624, such that the optical element 1632 swings in the positive direction based on the actuating axis 164. When the optical element 1632 swings in the positive direction based on the actuating axis 164, the light spot formed by the image light beam on the imaginary plane 1690 may move in the negative X-axis direction along the radial direction of the axial line 74. Based on the above, at time point t8, the light spot formed by the image light beam on the imaginary plane 1690 may move to and stay at position 8.

At time point t9, the driving signal 1661 changing from a high potential to a low potential may drive the moving frame 1621, such that the optical element 1631 swings in the negative direction based on the actuating axis 161. When the optical element 1631 swings in the negative direction based on the actuating axis 161, the light spot formed by the image light beam on the imaginary plane 1690 may move in the negative Y-axis direction along the radial direction of the axial line 1670. The driving signal 1662 is maintained at a low potential, so the driving signal 1662 may not drive the moving frame 1622, such that the optical element 1631 does not swing around the actuating axis 162. Accordingly, the light spot formed by the image light beam on the imaginary plane 1690 may not move along the radial direction of the axial line 1680. The driving signal 1663 changing from a high potential to a low potential may drive the moving frame 1623, such that the optical element 1632 swings in the negative direction based on the actuating axis 163. When the optical element 1632 swings in the negative direction based on the actuating axis 163, the light spot formed by the image light beam on the imaginary plane 1690 may move in the Y-axis direction along a radial direction of an axial line 75. The axial line 75 may be an axial line on the imaginary plane 1690 relative to the actuating axis 163 when the optical element 1631 swings in the negative direction based on the actuating axis 161 and the negative direction based on the actuating axis 162. The axial line 75 may be parallel to the X-axis direction. The driving signal 1664 is maintained at a high potential, so the driving signal 1664 may not drive the moving frame 1624, such that the optical element 1632 does not swing around the actuating axis 164. Accordingly, the light spot formed by the image light beam on the imaginary plane 1690 may not move along a radial direction of an axial line 76. The axial line 76 may be an axial line on the imaginary plane 1690 relative to the actuating axis 164 when the optical element 1631 swings in the negative direction based on the actuating axis 161 and the negative direction based on the actuating axis 162. The axial line 76 may be parallel to the Y-axis direction. Based on the above, at time point t9, the light spot formed by the image light beam on the imaginary plane 1690 may move to and stay at position 9.

At time point t10, the driving signal 1661 is maintained at a low potential, so the driving signal 1661 may not drive the moving frame 1621, such that the optical element 1631 does not swing around the actuating axis 161. Accordingly, the light spot formed by the image light beam on the imaginary plane 1690 may not move along the radial direction of the axial line 1670. The driving signal 1662 is maintained at a low potential, so the driving signal 1662 may not drive the moving frame 1622, such that the optical element 1631 does not swing around the actuating axis 162. Accordingly, the light spot formed by the image light beam on the imaginary plane 1690 may not move along the radial direction of the axial line 1680. The driving signal 1663 is maintained at a low potential, so the driving signal 1663 may not drive the moving frame 1623, such that the optical element 1632 does not swing around the actuating axis 163. Accordingly, the light spot formed by the image light beam on the imaginary plane 1690 may not move along a radial direction of the axial line 75. The driving signal 1664 changing from a high potential to a low potential may drive the moving frame 1624, such that the optical element 1632 swings in the negative direction based on the actuating axis 164. When the optical element 1632 swings in the negative direction based on the actuating axis 164, the light spot formed by the image light beam on the imaginary plane 1690 may move in the X-axis direction along a radial direction of the axial line 76. Based on the above, at time point t10, the light spot formed by the image light beam on the imaginary plane 1690 may move to and stay at position 10.

At time point t11, the driving signal 1661 is maintained at a low potential, so the driving signal 1661 may not drive the moving frame 1621, such that the optical element 1631 does not swing around the actuating axis 161. Accordingly, the light spot formed by the image light beam on the imaginary plane 1690 may not move along the radial direction of the axial line 1670. The driving signal 1662 is maintained at a low potential, so the driving signal 1662 may not drive the moving frame 1622, such that the optical element 1631 does not swing around the actuating axis 162. Accordingly, the light spot formed by the image light beam on the imaginary plane 1690 may not move along the radial direction of the axial line 1680. The driving signal 1663 changing from a low potential to a high potential may drive the moving frame 1623, such that the optical element 1632 swings in the positive direction based on the actuating axis 163. When the optical element 1632 swings in the positive direction based on the actuating axis 163, the light spot formed by the image light beam on the imaginary plane 1690 may move in the negative Y-axis direction along the radial direction of the axial line 75. The driving signal 1664 is maintained at a low potential, so the driving signal 1664 may not drive the moving frame 1624, such that the optical element 1632 does not swing around the actuating axis 164. Accordingly, the light spot formed by the image light beam on the imaginary plane 1690 may not move along the radial direction of the axial line 76. Based on the above, at time point t11, the light spot formed by the image light beam on the imaginary plane 1690 may move to and stay at position 11.

At time point t12, the driving signal 1661 is maintained at a low potential, so the driving signal 1661 may not drive the moving frame 1621, such that the optical element 1631 does not swing around the actuating axis 161. Accordingly, the light spot formed by the image light beam on the imaginary plane 1690 may not move along the radial direction of the axial line 1670. The driving signal 1662 is maintained at a low potential, so the driving signal 1662 may not drive the moving frame 1622, such that the optical element 1631 does not swing around the actuating axis 162. Accordingly, the light spot formed by the image light beam on the imaginary plane 1690 may not move along the radial direction of the axial line 1680. The driving signal 1663 is maintained at a high potential, so the driving signal 1663 may not drive the moving frame 1623, such that the optical element 1632 does not swing around the actuating axis 163. Accordingly, the light spot formed by the image light beam on the imaginary plane 1690 may not move along the radial direction of the axial line 75. The driving signal 1664 changing from a low potential to a high potential may drive the moving frame 1624, such that the optical element 1632 swings in the positive direction based on the actuating axis 164. When the optical element 1632 swings in the positive direction based on the actuating axis 164, the light spot formed by the image light beam on the imaginary plane 1690 may move in the negative X-axis direction along the radial direction of the axial line 76. Based on the above, at time point t12, the light spot formed by the image light beam on the imaginary plane 1690 may move to and stay at position 12.

At time point t13, the driving signal 1661 is maintained at a low potential, so the driving signal 1661 may not drive the moving frame 1621, such that the optical element 1631 does not swing around the actuating axis 161. Accordingly, the light spot formed by the image light beam on the imaginary plane 1690 may not move along the radial direction of the axial line 1670. The driving signal 1662 changing from a low potential to a high potential may drive the moving frame 1622, such that the optical element 1631 swings in a positive direction based on the actuating axis 162. When the optical element 1631 swings in the positive direction based on the actuating axis 162, the light spot formed by the image light beam on the imaginary plane 1690 may move in the negative X-axis direction along the radial direction of the axial line 1680. The driving signal 1663 changing from a high potential to a low potential may drive the moving frame 1623, such that the optical element 1632 swings in the negative direction based on the actuating axis 163. When the optical element 1632 swings in the negative direction based on the actuating axis 163, the light spot formed by the image light beam on the imaginary plane 1690 may move in the Y-axis direction along a radial direction of an axial line 77. The axial line 77 may be an axial line on the imaginary plane 1690 relative to the actuating axis 163 when the optical element 1631 swings in the negative direction based on the actuating axis 161 and the positive direction of the actuating axis 162. The axial line 77 may be parallel to the X-axis direction. The driving signal 1664 is maintained at a high potential, so the driving signal 1664 may not drive the moving frame 1624, such that the optical element 1632 does not swing around the actuating axis 164. Accordingly, the light spot formed by the image light beam on the imaginary plane 1690 may not move along a radial direction of an axial line 78. The axial line 78 may be an axial line on the imaginary plane 1690 relative to the actuating axis 164 when the optical element 1631 swings in the negative direction based on the actuating axis 161 and the positive direction of the actuating axis 162. The axial line 78 may be parallel to the Y-axis direction. Based on the above, at time point t13, the light spot formed by the image light beam on the imaginary plane 1690 may move to and stay at position 13.

At time point t14, the driving signal 1661 is maintained at a low potential, so the driving signal 1661 may not drive the moving frame 1621, such that the optical element 1631 does not swing around the actuating axis 161. Accordingly, the light spot formed by the image light beam on the imaginary plane 1690 may not move along the radial direction of the axial line 1670. The driving signal 1662 is maintained at a high potential, so the driving signal 1662 may not drive the moving frame 1622, such that the optical element 1631 does not swing around the actuating axis 162. Accordingly, the light spot formed by the image light beam on the imaginary plane 1690 may not move along the radial direction of the axial line 1680. The driving signal 1663 is maintained at a low potential, so the driving signal 1663 may not drive the moving frame 1623, such that the optical element 1632 does not swing around the actuating axis 163. Accordingly, the light spot formed by the image light beam on the imaginary plane 1690 may not move along a radial direction of the axial line 77. The driving signal 1664 changing from a high potential to a low potential may drive the moving frame 1624, such that the optical element 1632 swings in the negative direction based on the actuating axis 164. When the optical element 1632 swings in the negative direction based on the actuating axis 164, the light spot formed by the image light beam on the imaginary plane 1690 may move in the X-axis direction along a radial direction of the axial line 78. Based on the above, at time point t14, the light spot formed by the image light beam on the imaginary plane 1690 may move to and stay at position 14.

At time point t15, the driving signal 1661 is maintained at a low potential, so the driving signal 1661 may not drive the moving frame 1621, such that the optical element 1631 does not swing around the actuating axis 161. Accordingly, the light spot formed by the image light beam on the imaginary plane 1690 may not move along the radial direction of the axial line 1670. The driving signal 1662 is maintained at a high potential, so the driving signal 1662 may not drive the moving frame 1622, such that the optical element 1631 does not swing around the actuating axis 162. Accordingly, the light spot formed by the image light beam on the imaginary plane 1690 may not move along the radial direction of the axial line 1680. The driving signal 1663 changing from a low potential to a high potential may drive the moving frame 1623, such that the optical element 1632 swings in the positive direction based on the actuating axis 163. When the optical element 1632 swings in the positive direction based on the actuating axis 163, the light spot formed by the image light beam on the imaginary plane 1690 may move in the negative Y-axis direction along the radial direction of the axial line 77. The driving signal 1664 is maintained at a low potential, so the driving signal 1664 may not drive the moving frame 1624, such that the optical element 1632 does not swing around the actuating axis 164. Accordingly, the light spot formed by the image light beam on the imaginary plane 1690 may not move along the radial direction of the axial line 78. Based on the above, at time point t15, the light spot formed by the image light beam on the imaginary plane 1690 may move to and stay at position 15.

At time point t16, the driving signal 1661 is maintained at a low potential, so the driving signal 1661 may not drive the moving frame 1621, such that the optical element 1631 does not swing around the actuating axis 161. Accordingly, the light spot formed by the image light beam on the imaginary plane 1690 may not move along the radial direction of the axial line 1670. The driving signal 1662 is maintained at a high potential, so the driving signal 1662 may not drive the moving frame 1622, such that the optical element 1631 does not swing around the actuating axis 162. Accordingly, the light spot formed by the image light beam on the imaginary plane 1690 may not move along the radial direction of the axial line 1680. The driving signal 1663 is maintained at a high potential, so the driving signal 1663 may not drive the moving frame 1623, such that the optical element 1632 does not swing around the actuating axis 163. Accordingly, the light spot formed by the image light beam on the imaginary plane 1690 may not move along the radial direction of the axial line 77. The driving signal 1664 changing from a low potential to a high potential may drive the moving frame 1624, such that the optical element 1632 swings in the positive direction based on the actuating axis 164. When the optical element 1632 swings in the positive direction based on the actuating axis 164, the light spot formed by the image light beam on the imaginary plane 1690 may move in the negative X-axis direction along the radial direction of the axial line 78. Based on the above, at time point t16, the light spot formed by the image light beam on the imaginary plane 1690 may move to and stay at position 16.

At time point t17, the driving signal 1661 changing from a low potential to a high potential may drive the moving frame 1621, such that the optical element 1631 swings in the positive direction based on the actuating axis 161. When the optical element 1631 swings in the positive direction based on the actuating axis 161, the light spot formed by the image light beam on the imaginary plane 1690 may move in the Y-axis direction along the radial direction of the axial line 1670. The driving signal 1662 is maintained at a high potential, so the driving signal 1662 may not drive the moving frame 1622, such that the optical element 1631 does not swing around the actuating axis 162. Accordingly, the light spot formed by the image light beam on the imaginary plane 1690 may not move along the radial direction of the axial line 1680. The driving signal 1663 changing from a high potential to a low potential may drive the moving frame 1623, such that the optical element 1632 swings in the negative direction based on the actuating axis 163. When the optical element 1632 swings in the negative direction based on the actuating axis 163, the light spot formed by the image light beam on the imaginary plane 1690 may move in the Y-axis direction along the radial direction of the axial line 71. The driving signal 1664 is maintained at a high potential, so the driving signal 1664 may not drive the moving frame 1624, such that the optical element 1632 does not swing around the actuating axis 164. Accordingly, the light spot formed by the image light beam on the imaginary plane 1690 may not move along the radial direction of the axial line 72. Based on the above, at time point t17, the light spot formed by the image light beam on the imaginary plane 1690 may return to position 1.

Figure 17A:
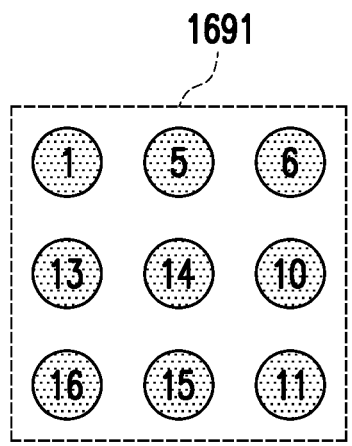
FIG. 17A is a schematic diagram showing a pixel according to an embodiment of the disclosure.

The controller 160 (shown in FIG. 1A to FIG. 1D) may adjust the swing angle of the frame body 610 or the swing angle of the frame body 620 during swinging by at least one driving assembly, thereby changing the appearance of the pixel 1691. FIG. 17A is a schematic diagram showing a pixel 1691 according to an embodiment of the disclosure. The light spot formed by the image light beam on the imaginary plane 1690 may move in a sequence from position 1 to position 16, thereby forming the pixel 1691. Since position 2 and position 5 are overlapped; position 4 and position 13 are overlapped, position 7 and position 10 are overlapped; position 3, position 8, position 9, and position 14 are overlapped; and position 12 and position 15 are overlapped, position 2, position 3, position 4, position 7, position 8, position 9, and position 12 are not show in FIG. 17A. On the basis of the pixel of FIG. 17A (reference may be made to FIG. 16A and FIG. 16B for other reference numerals), in this embodiment, the swing angle corresponding to the actuating axis 161, the swing angle corresponding to the actuating axis 162, the swing angle corresponding to the actuating axis 163, and the swing angle corresponding to the actuating axis 164 may be the same. Therefore, when an image light beam passes through the optical element 1631 and the optical element 1632 reciprocally swinging and is transmitted to the imaginary plane 1690 to form a light spot moving on the imaginary plane 1690, a displacement (e.g., a fourth displacement) of the light spot in the radial direction (e.g., a fourth radial direction) of the axial line 1670 corresponding to the actuating axis 161 (e.g., the fourth actuating axis), a displacement (e.g., a third displacement) of the light spot in the radial direction (e.g., a third radial direction) of the axial line 1680 corresponding to the actuating axis 162 (e.g., the third actuating axis), a displacement (e.g., a second displacement) of the light spot in the radial direction (e.g., a second radial direction) of the axial line 71 (or the axial line 73, the axial line 75, or the axial line 77) corresponding to the actuating axis 163 (e.g., the second actuating axis), and a displacement (e.g., a first displacement) of the light spot in the radial direction (e.g., a first radial direction) of the axial line 72 (or the axial line 74, the axial line 76, or the axial line 78) corresponding to the actuating axis 164 (e.g., the first actuating axis) may be the same.

Figure 18A:
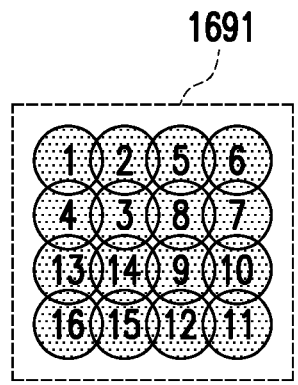
FIG. 18A is a schematic diagram showing a pixel according to still another embodiment of the disclosure.

FIG. 18A is a schematic diagram showing a pixel 1691 according to still another embodiment of the disclosure. The light spot formed by the image light beam on the imaginary plane 1690 may move in a sequence from position 1 to position 16, thereby forming the pixel 1691. On the basis of the pixel of FIG. 18A (reference may be made to FIG. 16A and FIG. 16B for other reference numerals), in this embodiment, the swing angle corresponding to the actuating axis 161 (or the swing angle corresponding to the actuating axis 162) may be 2 times the swing angle corresponding to the actuating axis 163 (or the swing angle corresponding to the actuating axis 164). Therefore, when an image light beam passes through the optical element 1631 and the optical element 1632 reciprocally swinging and is transmitted to the imaginary plane 1690 to form a light spot moving on the imaginary plane 1690, a displacement (e.g., a fourth displacement or a third displacement) of the light spot in the radial direction (e.g., the fourth radial direction or the third radial direction) of the axial line 1670 corresponding to the actuating axis 161 (e.g., the fourth actuating axis) or the axial line 1680 corresponding to the actuating axis 162 (e.g., the third actuating axis) may be 2 times a displacement (e.g., a second displacement or a first displacement) of the light spot in the radial direction (e.g., the second radial direction or the first radial direction) of the axial line 71 (or the axial line 73, the axial line 75, or the axial line 77) corresponding to the actuating axis 163 (e.g., the second actuating axis) or the axial line 72 (or the axial line 74, the axial line 76, the axial line 78) corresponding to the actuating axis 164 (e.g., the first actuating axis).

Figure 19A:
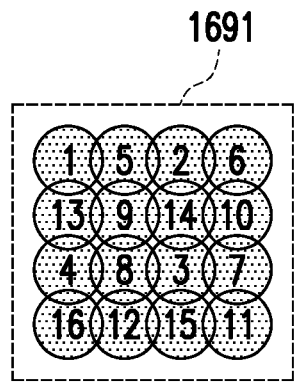
FIG. 19A is a schematic diagram showing a pixel according to yet another embodiment of the disclosure.

FIG. 19A is a schematic diagram showing a pixel 1691 according to yet another embodiment of the disclosure. The light spot formed by the image light beam on the imaginary plane 1690 may move in a sequence from position 1 to position 16, thereby forming the pixel 1691. On the basis of the pixel of FIG. 19A (reference may be made to FIG. 16A and FIG. 16B for other reference numerals), in this embodiment, the swing angle corresponding to the actuating axis 161 (or the swing angle corresponding to the actuating axis 162) may be ½ times the swing angle corresponding to the actuating axis 163 (or the swing angle corresponding to the actuating axis 164). Therefore, when an image light beam passes through the optical element 1631 and the optical element 1632 reciprocally swinging and is transmitted to the imaginary plane 1690 to form a light spot moving on the imaginary plane 1690, a displacement (e.g., a fourth displacement or a third displacement) of the light spot in the radial direction (e.g., the fourth radial direction or the third radial direction) of the axial line 1670 corresponding to the actuating axis 161 (e.g., the fourth actuating axis) or the axial line 1680 corresponding to the actuating axis 162 (e.g., the third actuating axis) may be ½ times a displacement (e.g., a second displacement or a first displacement) of the light spot in the radial direction (e.g., the second radial direction or the first radial direction) of the axial line 71 (or the axial line 73, the axial line 75, or the axial line 77) corresponding to the actuating axis 163 (e.g., the second actuating axis) or the axial line 72 (or the axial line 74, the axial line 76, the axial line 78) corresponding to the actuating axis 164 (e.g., the first actuating axis).

Figure 17B:
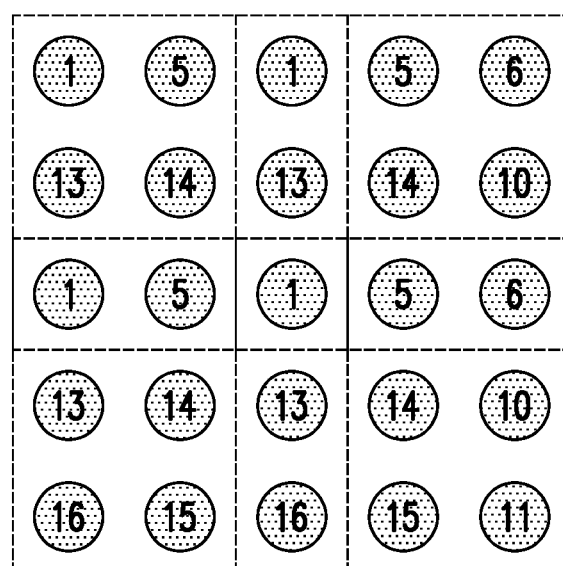
FIG. 17B is a diagram showing layout of a plurality of pixels corresponding to FIG. 17A.
Figure 18B:
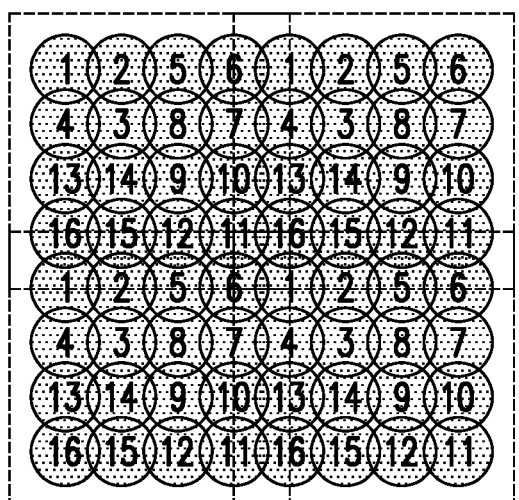
FIG. 18B is a diagram showing layout of a plurality of pixels corresponding to FIG. 18A.
Figure 19B:
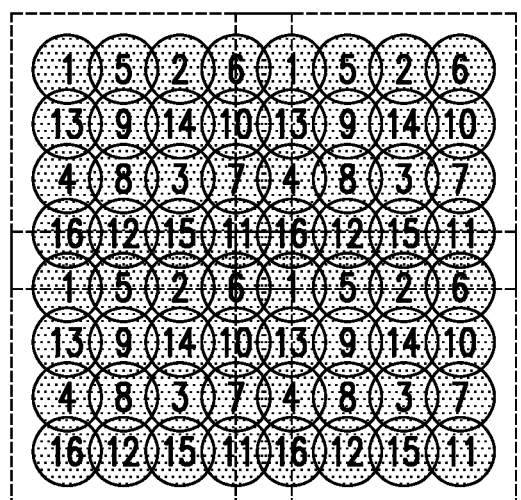
FIG. 19B is a diagram showing layout of a plurality of pixels corresponding to FIG. 19A.

FIG. 17B is a diagram showing layout of a plurality of pixels 1691 corresponding to FIG. 17A. FIG. 18B is a diagram showing layout of a plurality of pixels 1691 corresponding to FIG. 18A. FIG. 19B is a diagram showing layout of a plurality of pixels 1691 corresponding to FIG. 19A. According to FIG. 17B, FIG. 18B, and FIG. 19B, the layout generated by the plurality of pixels 1691 as shown in FIG. 18B can have a greater pixel density.

According to the embodiments of the disclosure shown in FIG. 16A to FIG. 19B, in the actuator 600 having four axes, by various ways of driving described above, the light spot formed by the image light beam on the imaginary plane 1690 may move between 16 positions to form the pixel 1691. Compared with the comparative example of FIG. 2A, FIG. 2B, and FIG. 2C and the comparative example of FIG. 3A, FIG. 3B, and FIG. 3C, the resolution of the image light beam can be further increased.

FIG. 20 is a flowchart of a projection method according to an embodiment of the disclosure. The projection method may be implemented by the actuator 150 shown in FIG. 1A to FIG. 1D, the actuator 400 shown in FIG. 4A, or the actuator 600 shown in FIG. 16A. In step S221, a first frame body is disposed in a first base, a first optical element is disposed in the first frame body, at least one first driving assembly is disposed between the first base and the first frame body, a second frame body is disposed in a second base, a second optical element is disposed in the second frame body, and at least one second driving assembly is disposed between the second base and the second frame body. In step S223, the at least one first driving assembly is controlled to drive the first frame body by a first signal, such that the first optical element reciprocally swings relative to the first base based on a first actuating axis and a second actuating axis, and the at least one second driving assembly is controlled to drive the second frame body by a second signal, such that the second optical element reciprocally swings relative to the second base based on a third actuating axis. The first signal includes a first driving signal corresponding to the first actuating axis and a second driving signal corresponding to the second actuating axis, and the second signal includes a third driving signal corresponding to the third actuating axis. The first driving signal and the second driving signal have a first frequency, and the third driving signal has a second frequency different from the first frequency. A phase difference between the first driving signal and the second driving signal is not equal to zero.

In summary of the foregoing, in the disclosure, the two frame bodies of the actuator may be respectively disposed in the projection device, and the two frame bodies are actuated based on at least three actuating axes. The actuator may control the optical element in each frame body to reciprocally swing based on each actuating axis according to the corresponding driving frequency. The light beam passing through the two optical elements generates a light spot moving along a fixed path on the imaginary plane, thereby forming a pixel. Compared with the conventional actuator, the actuator of the disclosure includes more actuating axes. Therefore, in the disclosure, the light spot formed by the image light beam on the imaginary plane may move between more positions, further increasing the resolution of the projection device. The actuator may generate a pixel in a specific shape by configuring the driving frequency of each actuating axis. The user may adjust the driving frequency of the actuator according to the pixel layout requirements. Accordingly the shape of the pixel may be adjusted to help increase the pixel density.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the present disclosure is intended to be dedicated to the public regardless of whether the element or component is explicitly recited in the following claims.

What is claimed is:

1. An actuator, comprising a first base, a first frame body, a first optical element, at least one first driving assembly, a second base, a second frame body, a second optical element, at least one second driving assembly, and a controller, wherein the first frame body is disposed in the first base;
the first optical element is disposed in the first frame body;
the at least one first driving assembly is disposed between the first base and the first frame body;
the second frame body is disposed in the second base;
the second optical element is disposed in the second frame body;
the at least one second driving assembly is disposed between the second base and the second frame body; and
the controller is coupled to the at least one first driving assembly and the at least one second driving assembly, wherein the controller is configured to control the at least one first driving assembly to drive the first frame body by a first signal, such that the first optical element reciprocally swings relative to the first base based on a first actuating axis and a second actuating axis, and control the at least one second driving assembly to drive the second frame body by a second signal, such that the second optical element reciprocally swings relative to the second base based on a third actuating axis,
wherein the first signal comprises a first driving signal corresponding to the first actuating axis and a second driving signal corresponding to the second actuating axis, and the second signal comprises a third driving signal corresponding to the third actuating axis,
wherein the first driving signal and the second driving signal have a first frequency, and the third driving signal has a second frequency different from the first frequency, and
wherein a phase difference between the first driving signal and the second driving signal is not equal to zero.

2. The actuator according to claim 1, wherein one of the first frequency and the second frequency is an integer multiple of the other of the first frequency and the second frequency.

3. The actuator according to claim 2, wherein the integer multiple comprises a double or a quadruple.

4. The actuator according to claim 1, wherein an image light beam passes through the first optical element and the second optical element reciprocally swinging and is transmitted to an imaginary plane to form a light spot moving on the imaginary plane, wherein a third displacement of the light spot in a third radial direction of the third actuating axis is $\sqrt{2}/2$ times a first displacement of the light spot in a first radial direction of the first actuating axis.

5. The actuator according to claim 1, wherein the first actuating axis is perpendicular to the second actuating axis.

6. The actuator according to claim 5, wherein the third actuating axis extends along an angle bisector between the first actuating axis and the second actuating axis.

7. The actuator according to claim 1, wherein the first frame body comprises a first moving frame and a second moving frame, wherein the first optical element is disposed in the first moving frame;
the first moving frame is disposed in the second moving frame and connected to the second moving frame; and
the second moving frame is disposed in the first base and connected to the first base.

8. The actuator according to claim 7, wherein the at least one first driving assembly comprises at least one first driving element and at least one second driving element, wherein the at least one first driving element is located between the first moving frame and the second moving frame; and
the at least one second driving element is located between the second moving frame and the first base.

9. The actuator according to claim 8, wherein
the at least one first driving element comprises two first driving elements respectively located on opposite sides of the first moving frame; and
the at least one second driving element comprises two second driving elements respectively located on opposite sides of the second moving frame.

10. The actuator according to claim 8, wherein
the at least one first driving element is located on the second actuating axis; and
the at least one second driving element is located on the first actuating axis.

11. The actuator according to claim 1, wherein the at least one second driving assembly comprises two third driving elements respectively located on opposite sides of the third actuating axis.

12. The actuator according to claim 1, wherein the second signal also comprises a fourth driving signal corresponding to a fourth actuating axis, and the controller is configured to control the at least one second driving assembly to drive the second frame body by the fourth driving signal, such that the second optical element reciprocally swings relative to the second base based on the fourth actuating axis.

13. The actuator according to claim 12, wherein the fourth driving signal has the second frequency, and a phase difference between the third driving signal and the fourth driving signal is not equal to zero.

14. The actuator according to claim 12, wherein the third actuating axis is parallel to the first actuating axis, and the fourth actuating axis is parallel to the second actuating axis.

15. The actuator according to claim 1, wherein the at least one first driving assembly comprises a voice coil motor or a piezoelectric material.

16. A projection device, comprising an illumination system, a light valve, a projection lens, and an actuator, wherein
the illumination system is configured to emit an illumination light beam;
the light valve is located on a first transmission path of the illumination light beam, and the light valve is configured to convert the illumination light beam into an image light beam;
the projection lens is located on a second transmission path of the image light beam, and the projection lens is configured to project the image light beam; and
the actuator is located on a transmission path of the image light beam, and the actuator is disposed between the light valve and the projection lens or a part of the actuator is disposed in the projection lens, wherein the actuator comprises a first base, a first frame body, a first optical element, at least one first driving assembly, a second base, a second frame body, a second optical element, at least one second driving assembly, and a controller, wherein
the first frame body is disposed in the first base;
the first optical element is disposed in the first frame body;
the at least one first driving assembly is disposed between the first base and the first frame body;
the second frame body is disposed in the second base;
the second optical element is disposed in the second frame body;
the at least one second driving assembly is disposed between the second base and the second frame body; and
the controller is coupled to the at least one first driving assembly and the at least one second driving assembly,
wherein the controller is configured to control the at least one first driving assembly to drive the first frame body by a first signal, such that the first optical element reciprocally swings relative to the first base based on a first actuating axis and a second actuating axis, and control the at least one second driving assembly to drive the second frame body by a second signal, such that the second optical element reciprocally swings relative to the second base based on a third actuating axis,
wherein the first signal comprises a first driving signal corresponding to the first actuating axis and a second driving signal corresponding to the second actuating axis, and the second signal comprises a third driving signal corresponding to the third actuating axis,
wherein the first driving signal and the second driving signal have a first frequency, and the third driving signal has a second frequency different from the first frequency, and
wherein a phase difference between the first driving signal and the second driving signal is not equal to zero.

17. The projection device according to claim 16, wherein one of the first frame body and the second frame body is disposed in the projection lens.

18. The projection device according to claim 16, further comprising a prism, wherein the prism is located on the transmission path of the image light beam, and the prism is disposed between the light valve and the projection lens,
wherein one of the first frame body and the second frame body is disposed between the prism and the light valve.

19. The projection device according to claim 16, further comprising a prism, wherein the prism is located on the transmission path of the image light beam, and the prism is disposed between the light valve and the projection lens,
wherein one of the first frame body and the second frame body is disposed between the prism and the projection lens.

20. A projection method, adapted for an actuator, wherein the actuator comprises a first base, a first frame body, a first optical element, at least one first driving assembly, a second base, a second frame body, a second optical element, and at least one second driving assembly, wherein the projection method comprises:
disposing the first frame body in the first base, disposing the first optical element in the first frame body, disposing the at least one first driving assembly between the first base and the first frame body, disposing the second frame body in the second base, disposing the second optical element in the second frame body, and disposing the at least one second driving assembly between the second base and the second frame body; and
controlling the at least one first driving assembly to drive the first frame body by a first signal, such that the first optical element reciprocally swings relative to the first base based on a first actuating axis and a second actuating axis, and controlling the at least one second driving assembly to drive the second frame body by a second signal, such that the second optical element reciprocally swings relative to the second base based on a third actuating axis,
wherein the first signal comprises a first driving signal corresponding to the first actuating axis and a second driving signal corresponding to the second actuating axis, and the second signal comprises a third driving signal corresponding to the third actuating axis, wherein the first driving signal and the second driving signal have a first frequency, and the third driving signal has a second frequency different from the first frequency, and wherein a phase difference between the first driving signal and the second driving signal is not equal to zero.

\* \* \* \* \*